(12) United States Patent
Imafuku et al.

(10) Patent No.: US 6,768,594 B2
(45) Date of Patent: Jul. 27, 2004

(54) PROJECTION LENS APPARATUS AND REAR PROJECTION TYPE IMAGE DISPLAY APPARATUS USING THE SAME

(75) Inventors: Daisuke Imafuku, Fujisawa (JP); Naoyuki Ogura, Machida (JP); Kazunari Nakagawa, Yokohama (JP); Koji Hirata, Yokohama (JP); Hidehiro Ikeda, Yokohama (JP); Shuji Kato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 10/113,337

(22) Filed: Mar. 28, 2002

(65) Prior Publication Data

US 2003/0095238 A1 May 22, 2003

(30) Foreign Application Priority Data

Apr. 26, 2001 (JP) ........................................ 2001-128621
Feb. 26, 2002 (JP) ........................................ 2002-048934

(51) Int. Cl.[7] ............................................... G02B 3/00
(52) U.S. Cl. ........................................ 359/649; 359/650
(58) Field of Search ................................. 359/649–651

(56) References Cited

U.S. PATENT DOCUMENTS 5,946,142 A * 8/1999 Hirata et al. ................. 359/649
6,130,786 A * 10/2000 Osawa et al. ................. 359/649

FOREIGN PATENT DOCUMENTS

| JP | 59-133517 | 7/1984 |
| JP | 7-159688 | 6/1995 |
| JP | 2000-147377 | 6/1995 |
| JP | 9-159914 | 6/1997 |
| JP | 10-221598 | 6/1997 |

* cited by examiner

Primary Examiner—Georgia Epps
Assistant Examiner—M. Hasan
(74) Attorney, Agent, or Firm—Townsend and Townsend and Crew LLP

(57) ABSTRACT

In a projection lens, there are arranged in order from a screen side, a first lens group including a meniscus lens having a convex lens surface in a central portion toward a screen with refracting power, a second lens group including a lens having a convex lens surface in a central portion toward a video generating source, a third lens group including a lens having convex lens surfaces in both sides with positive refracting power, a fourth lens group including a lens having a convex lens surface in a central portion toward the video generating source with positive refracting power, and a fifth lens group including a lens having a concave lens surface toward the screen with negative refracting power. An entrance pupil is arranged between incident and emitting surfaces of a power lens.

22 Claims, 8 Drawing Sheets

PROJECTION LENS APPARATUS AND REAR PROJECTION TYPE IMAGE DISPLAY APPARATUS USING THE SAME

BACKGROUND OF THE INVENTION

The present invention relates to a projection lens for making an extended projection of an image from a video generating source using a CRT or other projection tube on a screen and displaying the extended image on the screen and a projection type image display apparatus using the same, and more particularly to a projection lens apparatus preferable for obtaining a high-contrast and bright image superior in a focusing performance with very little image distortion and a rear projection type image display apparatus using the same.

In recent years, a tendency of horizontally widening of a screen of a television set as a home image display apparatus has brought with it a large-sized screen thereof. There are two types of this home image display apparatus; a direct-view type using a cathode-ray tube (CRT), and a rear projection type for making an extended projection of an image from a video generating source, a small projection tube (CRT) having a size of 5 to 7 inches or so, on a screen from the rear side using a projection lens apparatus. From a viewpoint of compactness, weight and cost of the set, a rear projection type image display apparatus is in the mainstream as one having a screen size in excess of 37 inches.

As a projection lens apparatus for use in a rear projection type image display apparatus, there are known projection lens apparatuses described in JP-A-7-159688 (hereinafter, referred to as a first conventional art) and in JP-A-9-159914 (hereinafter, referred to as a second conventional art), for example. In the first conventional art, there is disclosed a lens of construction 5-groups 5-elements having a spherical glass lens of a low dispersion and a high refractive index and four aspherical lenses, as a power lens having the strongest positive refracting power included in the third lens group 3. In the second conventional art, there is disclosed a lens of construction 6-groups 6-elements having a spherical glass lens of a high dispersion and a low refractive index and five aspherical lenses, as a power lens.

The projection lens apparatus is required to have a short focal length in order to realize a compact set, to have a bright screen peripheral portion and a favorable focusing performance, and to be manufactured at low cost. In order to realize the low cost, it is the most effective to decrease the number of lenses in a lens construction to the minimum and to use an inexpensive optical glass lens as a power lens. In general, the higher the refractive index is and the lower the dispersion is, the more expensive the optical glass is.

The optical glass used for the power lens of the first conventional art is a low-dispersion glass having high refracting power, SK16. Regarding a price of this optical glass, the price of SK16 is twice or more times (2.1) that of SK5 as a reference (1.0), which is a typical optical glass for use in a projection lens apparatus. Therefore, in the first conventional art, the lens construction of 5-elements is applied to reduce the cost.

If an inexpensive spherical glass lens of a high dispersion and a low refractive index is used as a power lens for further cost reduction, however, not only it becomes harder to obtain desired refracting power, but a generated aberration amount also increases. Furthermore, since an aspherical plastic lens having a role of correcting aberrations has 10 or lower degree of an aspherical coefficient, an aberration correcting capability is insufficient due to restrictions of a permissible lens shape and the number of aspherical lens elements. As a result, while it is possible to realize a low cost, it becomes hard to favorably correct aberrations. It is hard to realize a low cost by using an expensive spherical glass lens of a low dispersion and a high refractive index.

A generated amount of an image distortion such as a distortion largely depends upon a positional relationship between a power lens (a glass lens) and an entrance pupil. The distortion is a phenomenon that an original image from a video generating source is projected in a form of a distorted image on a screen due to a difference between a magnifying power on an optical axis (paraxial) and a magnifying power in a peripheral portion. If the entrance pupil is located in the screen side of the power lens, a peripheral magnifying power is higher than the paraxial magnifying power and therefore it causes a pincushion distortion, while if the entrance pupil is located in the video generating source side of the power lens, the peripheral magnifying power is lower than the paraxial magnifying power and therefore it causes a barrel distortion. In other words, the distortion is caused by an increase of a difference between the peripheral magnifying power and the paraxial magnifying power since the chief ray passing through the center of the entrance pupil from each object point on the video generating source passes over a location apart from the optical axis of the power lens.

In the first conventional art, there is arranged a second group lens, which corrects a spherical aberration and a coma aberration, having weak negative refracting power in the screen side of the power lens. Therefore, if it is attempted to realize a further wide field angle (short projection distance), the position of the entrance pupil of the entire lens system shifts from the center of the third group lens toward the screen. This results in an increase of the distortion. Due to the aberration correcting capability of the aspherical plastic lens as set forth in the above, it is hard to correct the distortion favorably.

In the second conventional art, the cost reduction is possible to some extent due to a use of an inexpensive spherical glass lens having a high dispersion and a low refractive index as a power lens. The second conventional art, however, requires further aspherical lens for an aberration correction (one more element than the first conventional art) for favorably correcting the aberration increased by using the spherical glass lens having a high dispersion and a low refractive index. Therefore, it results in unsuccessful drastic cost reduction.

In addition, the projection lens apparatus is required to improve a contrast. Generally, importance is attached to an aberration correcting capability of a projection lens as a lens performance of a projection lens apparatus. As an image quality in a rear projection type image display apparatus, however, an improvement of a contrast indicating a white-and-black ratio of an image becomes an important element for determining whether or not the lens performance is good. To improve the contrast, there is a need for arranging respective lens groups spaced as far as possible from each other to prevent a reflected light (unnecessary light) in each lens group in the projection lens apparatus from returning to the original image. This results in an increase of aberrations in almost all cases, thereby requiring a higher correcting capability for correcting the aberration favorably. In the arrangements of the first and second conventional arts, it is hard to further improve the correcting capability, and therefore it is also hard to improve the contrast.

Generally, to satisfy conditions of a desired magnifying power and performance in such a case that a projection lens apparatus is used for a rear projection type image display apparatus having a wide angle of field, there is a need for arranging a glass lens having the strongest power among the lenses of the projection lens apparatus in the side of the video generating source. Accordingly, with a change of a relative position of the entrance pupil and the power lens (glass lens), a position of the chief ray from each object point on the video generating source changes and the image distortion and an astigmatism increases, by which it becomes hard to correct the aberration.

Furthermore, an arrangement of a power lens in the side of the video generating source extends a width of a luminous flux incident on a plastic lens having a role of correcting aberrations arranged in the screen side of the power lens. Therefore, to achieve brightness equivalent to an initial performance, there is a need for an enlargement of an aperture of this plastic lens for correcting the aberration and the enlargement of the lens aperture becomes a factor in a difficulty of the cost reduction.

SUMMARY OF THE INVENTION

In view of the above problems of the conventional arts, the present invention has been provided. It is an object of the present invention to provide a projection lens apparatus capable of reducing a cost in a wide angle of field and of correcting an aberration favorably, and a rear projection type image display apparatus using the same.

It is another object of the present invention to provide a projection lens apparatus which enables an improvement of a contrast, and a rear projection type image display apparatus using the same.

In other words, in the present invention, various devices are made for a single piece of projection lens and for an application of it to an apparatus. Specifically, in accordance with a first aspect, a second aspect, and sixth aspect of the present invention, the present invention is characterized by an arrangement in which an entrance pupil of a projection lens apparatus is located between a light incident surface and a light emitting surface of a power lens (included in the third lens group 3) having the strongest positive refracting power among a plurality of lens elements in the projection lens apparatus. This causes the chief ray from each object point on the video generating source to pass in the vicinity of the optical axis on the incident and emitting surfaces of the glass lens, thereby lowering a frequency of an occurrence of a distortion and astigmatism. Then, even if a construction of 5-groups 5-elements is applied by using an inexpensive glass material having an Abbe number vd of 60 or higher and a refractive index (nd) of 1.600 or lower for a power lens, for example, it is possible to suppress an occurrence of a distortion and astigmatism to a low level so as to secure a favorable correcting capability.

As set forth hereinabove, the present invention has a lens construction enabling an occurrence of an image distortion to be fully suppressed. Therefore, even if an inexpensive spherical glass lens having a high dispersion and a low refractive index is used as a power lens, for example, it is possible to fully correct an aberration by using four aspherical lenses, for example. Therefore, in this condition, desired brightness and focusing performance can be achieved. In other words, according to the present invention, it is possible to realize a low-cost projection lens apparatus having favorable image brightness and focusing performance, and a projection type image display apparatus using the same.

For insufficient refracting power caused by a use of an inexpensive optical glass having a low refractive index for a power lens, a desired refracting power may be obtained by distributing it to the second lens group 2 including an aspherical plastic lens for correcting a spherical aberration and a coma aberration arranged in the screen side of the glass lens.

An increase of the refracting power of the aspherical plastic lens accelerates deterioration of a performance in response to a temperature change or moisture penetration. To prevent it, preferably a curvature radius is increased (166 mm or higher) on one of the surfaces of the glass lens, which affects the performance most significantly among a plurality of lens elements. This reduces sensitivity to eccentricity or inclination caused by deterioration of an assembly precision of a lens tube, which may be made in response to a temperature change or moisture penetration, so as to prevent deterioration of a performance in response to the temperature change or moisture penetration.

A use of the inexpensive optical glass having a low refractive index for the power lens causes the refracting power to be insufficient, by which the spherical aberration increases. To cope with this, preferably a lens in an aspherical form represented by 14 or higher degree of an aspherical coefficient is used as an aspherical plastic lens having a role of correcting aberrations in the projection lens apparatus.

As set forth in the above, by using many aspherical shapes each having an aspherical amount and a complicated form, it becomes possible to achieve a capability of correcting an aberration in a ray which passes through a peripheral portion of the entrance pupil from each object point on the video generating source.

A decrease of a contrast in the projection lens apparatus is caused by a reflection of a reflected light generated on an air-side interface (light emitting surface) of a meniscus lens having a concave surface toward the screen, arranged in a position closest to the video generating source. This reflected light reduces the contrast by returning to a low luminance portion of an original image which appears on a display surface of the video generating source. Therefore, in the present invention, preferably the apparatus has a distance between the light emitting surface and an incident surface of the phosphor surface glass of the meniscus lens so as to be as long as possible. This does not decrease the amount of the entire reflected light generated on the air-side interface (light emitting surface) of the meniscus lens and returning to the video generating source, but it elongates an optical path of the reflected light up to the video generating source, by which the reflected light is spread out, thereby decreasing an intensity per area. It improves the contrast.

Furthermore, preferably there can be a wavelength selective filter for absorbing wavelengths other than a dominant wavelength of the original image in at least one of the meniscus lens or lens and coolant for cooling the video generating source put in contact with the meniscus lens. This reduces the reflected light effectively and suppresses generation of a chromatic aberration.

Finally, the problem of realizing a wide angle of field of the projection lens can be resolved by increasing a power distribution of the third lens group 3 of the projection lens. This not only enables an achievement of a desired magnifying power, but also minimizes a spread of a width of a luminous flux incident on the first group lens and the second group lens having a role of correcting aberrations arranged in the screen side of the power lens. This makes it possible to cope with a wide angle of field without increasing an aperture of the plastic lens for correcting aberrations.

In addition, by increasing a power distribution of the third lens group, a lateral aberration in the meridional direction of a ray in a periphery can also be controlled due to a high positive refractive index in a peripheral portion of the emitting surface of the third lens group and a negative refracting power and an aspherical shape in a peripheral portion of the emitting surface of the first lens group. Therefore, it is possible to cope with a wide angle of field with keeping the aberration correcting capability favorably.

Other objects, features and advantages of the invention will become apparent from the following description of the embodiments of the invention taken in conjunction with the accompanying drawings.

DETAILED DESCRIPTION OF THE EMBODIMENTS

Figure 2:
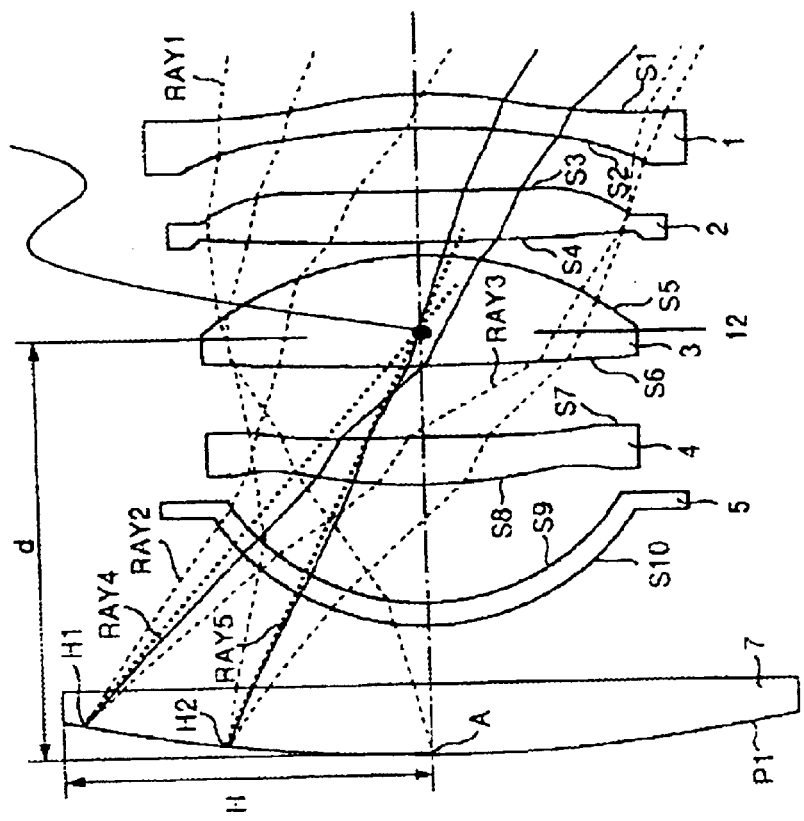
FIG. 2 is a diagram of assistance in explaining a result of ray tracing and a position of an entrance pupil of the projection lens apparatus according to the present invention.
Figure 1:
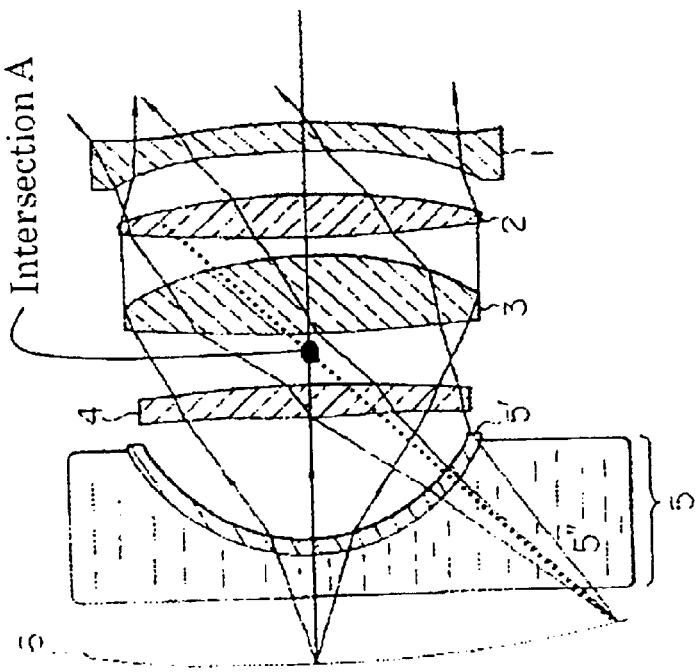
FIG. 1 is a cross section of an embodiment of a projection lens apparatus according to the present invention.

The preferred embodiments of the present invention will now be described in detail hereinafter. Referring to FIG. 1, there is shown a sectional view indicating a lens main portion of a projection lens apparatus according to an embodiment of the present invention. Actions of respective lens groups in the embodiment of the projection lens apparatus according to the present invention shown in FIG. 1 will be described below by referring to FIG. 2. The first group lens 1 corrects a spherical aberration for a video luminous flux (upper limit ray 1) from an object point "A" on an axis, and a coma aberration for a video luminous flux (upper limit ray 2, lower limit ray 3) from an object point $H_1$ in a screen peripheral portion. The second group lens 2 corrects astigmatism and a coma aberration. The third group lens 3 is made of glass to reduce a drift of a focusing performance caused by a temperature change. The third group lens is also referred to as a power lens since it has the strongest positive refracting power in the entire system. Furthermore, in this embodiment, SK5 (Schott glass material catalog name) that is an inexpensive optical glass or a material having the equivalent low refractive index and high dispersion is used. The fourth group lens 4 corrects a high-degree coma aberration which may occur in a video luminous flux (the upper limit ray 2, the lower limit ray 3) from the object point $H_1$ in the screen peripheral portion as shown in FIG. 2. The fifth group lens 5 corrects image plane bending together with a phosphor surface $P_1$ of a projection tube (CRT). The fifth group lens 5 is a meniscus lens having a concave surface toward the screen, with its light incident surface combined with coolant 6 for cooling the projection tube. In other words, the coolant 6 is filled liquid-tight into a space between the fifth group lens and the projection tube panel 7. The first group lens 1 to the fourth group lens 4 are incorporated into an inner lens tube 8, and the inner lens tube 8 is fixed to an outer lens tube 9. Furthermore, this outer lens tube 9 is fixed to a bracket 10. Then, an image on the projection tube phosphor surface $P_1$ that is an object surface is extended and projected on a screen 11. In the embodiment of the present invention, a focal length of the fifth group lens is calculated including the projection tube panel 7, the coolant 6 and the phosphor surface $P_1$.

In this projection lens apparatus, the present invention is characterized by an arrangement of an entrance pupil of the projection lens apparatus located between a light incident surface and a light emitting surface of the third lens group 3 which is a power lens. Hereinafter, this characteristic arrangement will be described in detail by referring to FIGS. 3A and 3B.

Figure 3A:
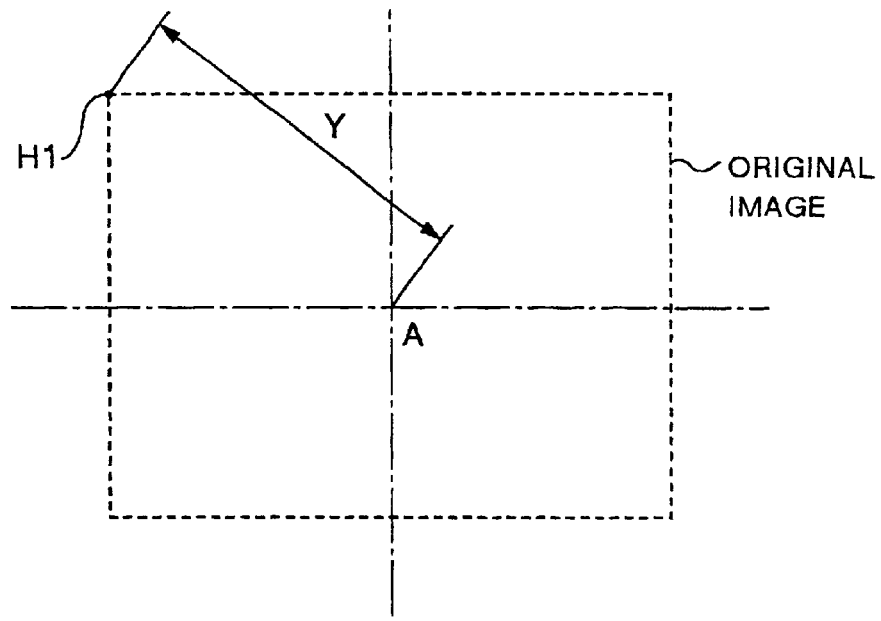
FIGS. 3A and 3B are definition explanatory diagrams of a distortion.
Figure 3B:
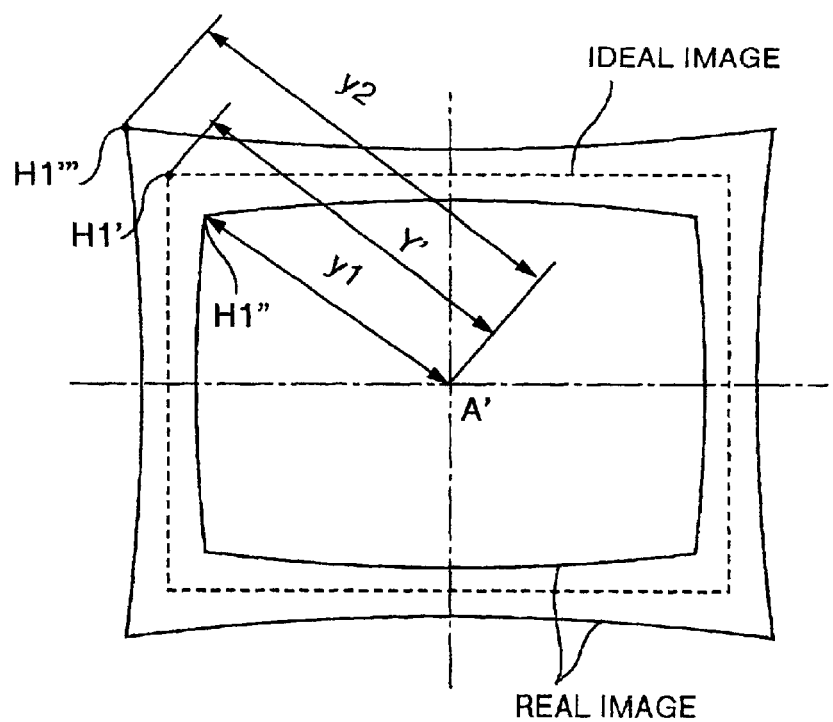

Referring to FIGS. 3A and 3B, there are shown definition explanatory diagrams of a distortion. The distortion is a phenomenon that an original image on a video generating source is projected in a form of a distorted image on a screen due to a difference between a magnifying power on an optical axis (paraxial) and a magnifying power in a peripheral portion; with an ideal image height Y' assumed to be an image point $P_1$ at which an object point $H_1$ in an object height Y of an original image forms an image at an equal magnifying power to a paraxial magnifying power as shown in FIG. 3, a degree of distortion is represented by a percentage of an expanded or contracted distance by comparing image heights $Y_1$ and $Y_2$ of a real image point $P_2$ and $P_3$ with Y'. Furthermore, an amount of the distortion significantly depends upon a positional relationship between the glass lens and the entrance pupil. If the entrance pupil is located in the screen side of the glass lens, the peripheral magnifying power is higher than the paraxial magnifying power, and therefore the real image height is in the side of $Y_2$, thereby causing a pincushion distortion. If the entrance pupil is located in the video generating source side of the glass lens, the peripheral magnifying power is lower than the paraxial magnifying power, and therefore the real image height is in the side of $Y_1$, thereby causing a barrel distortion. In either case, if the chief ray passing through the center of the entrance pupil from the object point $H_1$ on the video generating source passes over the position farther from the optical axis of the glass lens, a difference from the paraxial magnifying power is increased proportionally. In other words, if the glass lens is arranged farther from the entrance pupil, the chief ray passes through a further peripheral portion of the glass lens correspondingly, thereby increasing the distortion.

In the present invention, as shown in FIG. 2, a virtual entrance pupil 12 is arranged at a position spaced a distance d away from the projection tube phosphor surface $P_1$ which is an object surface, and the entrance pupil 12 is located between an emitting surface S5 and an incident surface S6 of the third group lens 3. This causes the chief rays, ray 4 and ray 5 from the maximum image height point $H_1$ and the middle image height point $H_2$ of a height H from the optical axis of the projection tube phosphor surface P, to pass through a portion in the vicinity of the optical axis within ±20 mm as a height from the optical axis on the incident surface S6 and the emitting surface S5 of the third group lens 3, so as to suppress an occurrence of a distortion and astigmatism.

Tables 1 to 11 show lens data corresponding to the embodiment of the projection lens according to the present invention shown in FIG. 1. Furthermore, Table 12 shows the maximum image height point $H_1$ of a height H from the optical axis of the projection tube phosphor surface $P_1$, a distance d from the projection tube phosphor surface $P_1$, and a distortion amount, corresponding to each lens data of Tables 1 to 11. The "Data No." in Table 12 corresponds to a table number. As shown in Table 12, the following relation is satisfied regarding the height H from the optical axis of the maximum image height point $H_1$ of the projection tube phosphor surface $P_1$ and the distance d from the projection tube phosphor surface $P_1$:

$$0.635 \leq H/d \leq 0.857$$

With an arrangement of the glass lens at a position including the entrance pupil set in a range where this relation is satisfied, the distortion amount can be suppressed to 1.5% to 7.5%.

TABLE 1

| Data No. 1 | | | | | f = 82.75, Fno = 0.99 |
|---|---|---|---|---|---|
| Lens construction | Lens surface | Curvature radius RD | Face-to-face length TH | Abbe number ν d | Refractive index |
| Screen | — | INFINITY | 862.000 | — | 1 |
| First lens | S1 | 78.526 | 7.350 | 57.9 | 1.4924 |
|  | S2 | 164.603 | 13.430 |  | 1 |
| Second lens | S3 | −284.661 | 10.000 | 57.9 | 1.4924 |
|  | S4 | −236.537 | 4.030 |  | 1 |
| Third lens | S5 | 69.180 | 22.000 | 61.25 | 1.59137 |
|  | S6 | −1311.260 | 14.530 |  | 1 |
| Fourth lens | S7 | 10000.000 | 10.000 | 57.9 | 1.4924 |
|  | S8 | −132.174 | 25.460 |  | 1 |
| Fifth lens | S9 | −46.797 | 4.500 | 57.9 | 1.4924 |
|  | S10 | −50.132 | 12.600 |  | 1.44703 |
| Transparent medium | Refrigerant | INFINITY |  | — |  |
| CRT | Face surface | INFINITY | 14.100 | — | 1.56232 |
|  | Phosphor surface | −350.000 | 0.000 |  |  |

| Lens construction | Lens surface | Aspherical coefficient | | | | | | Data No. 1 |
|---|---|---|---|---|---|---|---|---|
|  |  | K | A | B | C | D | E | F |
| First lens | S1 | 0.0604 | −1.09E−06 | −2.19E−09 | 1.26E−12 | −2.84E−16 | 2.50E−20 | 0.0 |
|  | S2 | 0.0163 | −5.49E−08 | −2.02E−09 | 2.42E−12 | −1.02E−15 | 1.85E−19 | 0.0 |
| Second lens | S3 | 0 | 2.11E−06 | 3.04E−10 | 5.59E−13 | −5.14E−16 | 1.08E−19 | 0.0 |
|  | S4 | 17.7867 | 1.41E−06 | −2.77E−10 | 2.34E−13 | −1.69E−16 | 3.96E−20 | 0.0 |
| Fourth lens | S7 | 0 | −1.15E−06 | 6.63E−10 | −9.35E−13 | 1.11E−15 | −3.98E−19 | 0.0 |
|  | S8 | 0.4485 | 2.42E−07 | 1.09E−09 | −1.39E−12 | 1.75E−15 | −5.48E−19 | 0.0 |
| Fifth lens | S9 | 0 | −9.95E−07 | −5.67E−10 | 2.07E−12 | −1.59E−15 | 4.45E−19 | 0.0 |

TABLE 2

| Data No. 2 | | | | | f = 81.34, Fno = 0.98 |
|---|---|---|---|---|---|
| Lens construction | Lens surface | Curvature radius RD | Face-to-face length TH | Abbe number ν d | Refractive index |
| Screen | — | INFINITY | 865.086 | — | 1 |
| First lens | S1 | 78.379 | 7.350 | 57.9 | 1.4924 |
|  | S2 | 167.881 | 13.891 |  | 1 |
| Second lens | S3 | −292.697 | 10.000 | 57.9 | 1.4924 |
|  | S4 | −229.024 | 1.651 |  | 1 |
| Third lens | S5 | 71.598 | 22.000 | 61.25 | 1.59137 |
|  | S6 | −883.919 | 14.128 |  | 1 |
| Fourth lens | S7 | 10000.000 | 10.000 | 57.9 | 1.4924 |
|  | S8 | −119.682 | 24.695 |  | 1 |
| Fifth lens | S9 | −45.286 | 4.500 | 57.9 | 1.4924 |
|  | S10 | −50.132 | 12.800 |  | 1.44703 |
| Transparent medium | Refrigerant | INFINITY |  | — |  |
| CRT | Face surface | INFINITY | 14.100 | — | 1.56232 |
|  | Phosphor surface | −350.000 | 0.000 |  |  |

TABLE 2-continued

| Lens construction | Lens surface | Aspherical coefficient | | | | | | Data No. 2 |
|---|---|---|---|---|---|---|---|---|
| | | K | A | B | C | D | E | F |
| First lens | S1 | 0.0636 | −1.09E−06 | −2.19E−09 | 1.26E−12 | −2.83E−16 | 2.45E−20 | 0.0 |
| | S2 | 0.9268 | −2.52E−08 | −2.00E−09 | 2.42E−12 | −1.02E−15 | 1.67E−19 | 0.0 |
| Second lens | S3 | −0.2952 | 2.11E−06 | 2.99E−10 | 5.58E−13 | −5.14E−16 | 1.08E−19 | 0.0 |
| | S4 | 18.2411 | 1.40E−06 | −2.73E−10 | 2.37E−13 | −1.68E−16 | 3.96E−20 | 0.0 |
| Fourth lens | S7 | −8.054E+04 | −1.16E−06 | 5.98E−10 | −9.74E−13 | 1.11E−15 | −3.80E−19 | 0.0 |
| | S8 | 1.5439 | 1.71E−07 | 1.03E−09 | −1.44E−12 | 1.73E−15 | −5.47E−19 | 0.0 |
| Fifth lens | S9 | 0.0805 | −8.40E−07 | −7.53E−10 | 2.16E−12 | −1.54E−15 | 4.08E−19 | 0.0 |

TABLE 3

Data No. 3     f = 79.18, Fno = 0.96

| Lens construction | Lens surface | Curvature radius RD | Face-to-face length TH | Abbe number ν d | Refractive index |
|---|---|---|---|---|---|
| Screen | — | INFINITY | 870.406 | — | 1 |
| First lens | S1 | 80.182 | 7.350 | 57.9 | 1.4924 |
| | S2 | 190.786 | 12.613 | | 1 |
| Second lens | S3 | −313.608 | 10.000 | 57.9 | 1.4924 |
| | S4 | −223.586 | 0.100 | | 1 |
| Third lens | S5 | 76.279 | 22.000 | 61.25 | 1.59137 |
| | S6 | −555.563 | 12.680 | | 1 |
| Fourth lens | S7 | 9889.098 | 10.000 | 57.9 | 1.4924 |
| | S8 | −104.293 | 23.651 | | 1 |
| Fifth lens | S9 | −43.055 | 4.500 | 57.9 | 1.4924 |
| | S10 | −50.132 | 12.600 | | 1.44703 |
| Transparent medium | Refrigerant | INFINITY | | — | |
| CRT | Face surface | INFINITY | 14.100 | — | 1.56232 |
| | Phosphor surface | −350.000 | 0.000 | | |

| Lens construction | Lens surface | Aspherical coefficient | | | | | | Data No. 3 |
|---|---|---|---|---|---|---|---|---|
| | | K | A | B | C | D | E | F |
| First lens | S1 | 0.1357 | −9.70E−07 | −2.32E−09 | 1.29E−12 | −2.65E−16 | 1.74E−20 | 0.0 |
| | S2 | 7.4209 | 1.42E−07 | −1.81E−09 | 2.40E−12 | −1.05E−15 | 1.81E−19 | 0.0 |
| Second lens | S3 | −22.7609 | 2.16E−06 | 2.99E−10 | 5.37E−13 | −5.31E−16 | 1.02E−19 | 0.0 |
| | S4 | 22.3997 | 1.28E−06 | −3.46E−10 | 2.36E−13 | −1.60E−16 | 3.70E−20 | 0.0 |
| Fourth lens | S7 | 6.456E+04 | −1.57E−06 | 4.45E−10 | −1.11E−12 | 1.10E−15 | −3.20E−19 | 0.0 |
| | S8 | 3.2279 | −1.09E−07 | 8.09E−10 | −1.51E−12 | 1.72E−15 | −5.51E−19 | 0.0 |
| Fifth lens | S9 | 0.0807 | −9.20E−07 | −1.44E−09 | 2.40E−12 | −1.36E−15 | 2.06E−19 | 0.0 |

TABLE 4

Data No. 4     f = 72.64, Fno = 0.90

| Lens construction | Lens surface | Curvature radius RD | Face-to-face length TH | Abbe number ν d | Refractive index |
|---|---|---|---|---|---|
| Screen | — | INFINITY | 861.545 | — | 1 |
| First lens | S1 | 83.433 | 7.350 | 57.9 | 1.4924 |
| | S2 | 164.575 | 11.785 | | 1 |
| Second lens | S3 | −277.030 | 10.000 | 57.9 | 1.4924 |
| | S4 | −224.449 | 3.032 | | 1 |
| Third lens | S5 | 76.145 | 22.000 | 61.25 | 1.59137 |
| | S6 | −447.756 | 16.951 | | 1 |
| Fourth lens | S7 | 209.361 | 10.000 | 57.9 | 1.4924 |
| | S8 | −123.880 | 26.138 | | 1 |
| Fifth lens | S9 | −48.345 | 4.500 | 57.9 | 1.4924 |
| | S10 | −50.132 | 12.600 | | 1.44703 |
| Transparent medium | Refrigerant | INFINITY | | — | |
| CRT | Face surface | INFINITY | 14.100 | — | 1.56232 |
| | Phosphor surface | −350.000 | 0.000 | | |

TABLE 4-continued

| Lens construction | Lens surface | Aspherical coefficient | | | | | | Data No. 4 |
|---|---|---|---|---|---|---|---|---|
| | | K | A | B | C | D | E | F |
| First lens | S1 | −0.4815 | −1.28E−06 | −2.25E−09 | 1.31E−12 | −2.54E−16 | 1.40E−20 | 0.0 |
| | S2 | −6.4786 | −1.80E−07 | −1.82E−09 | 2.36E−12 | −1.05E−15 | 1.81E−19 | 0.0 |
| Second lens | S3 | 2.6565 | 2.10E−06 | 4.03E−10 | 5.13E−13 | −5.75E−16 | 1.31E−19 | 0.0 |
| | S4 | 18.6621 | 1.40E−06 | −2.81E−10 | 2.35E−13 | −1.67E−16 | 3.89E−20 | 0.0 |
| Fourth lens | S7 | −1.220E+12 | −1.25E−06 | 5.22E−10 | −1.23E−12 | 1.07E−15 | −2.78E−19 | 0.0 |
| | S8 | 4.0747 | −7.31E−06 | 1.25E−09 | −1.95E−12 | 1.67E−15 | −4.27E−19 | 0.0 |
| Fifth lens | S9 | 0.0862 | −1.25E−06 | −3.79E−10 | 1.88E−12 | −1.31E−15 | 3.04E−19 | 0.0 |

TABLE 5

| Data No. 5 | | | | | f = 67.24, Fno = 0.84 | |
|---|---|---|---|---|---|---|
| Lens construction | Lens surface | Curvature radius RD | Face-to-face length TH | Abbe number ν d | Refractive index | |
| Screen | — | INFINITY | 869.251 | — | 1 | |
| First lens | S1 | 83.391 | 7.350 | 57.9 | 1.4924 | |
| | S2 | 199.357 | 12.799 | | 1 | |
| Second lens | S3 | −1322.507 | 10.000 | 57.9 | 1.4924 | |
| | S4 | −301.112 | 0.380 | | 1 | |
| Third lens | S5 | 93.952 | 22.000 | 61.25 | 1.59137 | |
| | S6 | −171.334 | 19.376 | | 1 | |
| Fourth lens | S7 | 133.901 | 10.000 | 57.9 | 1.4924 | |
| | S8 | −128.965 | 17.640 | | 1 | |
| Fifth lens | S9 | −37.553 | 4.500 | 57.9 | 1.4924 | |
| | S10 | −50.132 | 12.600 | | 1.44703 | |
| Transparent medium | Refrigerant | INFINITY | | — | | |
| CRT | Face surface | INFINITY | 14.100 | — | 1.56232 | |
| | Phosphor surface | −350.000 | 0.000 | | | |

| Lens construction | Lens surface | Aspherical coefficient | | | | | | Data No. 5 |
|---|---|---|---|---|---|---|---|---|
| | | K | A | B | C | D | E | F |
| First lens | S1 | −0.1487 | −1.20E−06 | −2.22E−09 | 1.22E−12 | −3.00E−16 | 3.21E−20 | 0.0 |
| | S2 | 10.4184 | 1.83E−07 | −1.99E−09 | 2.35E−12 | −1.07E−15 | 1.70E−19 | 0.0 |
| Second lens | S3 | −398.4178 | 1.93E−06 | 2.98E−10 | 5.43E−13 | −5.19E−16 | 1.22E−19 | 0.0 |
| | S4 | 24.4865 | 8.56E−07 | −3.00E−10 | 3.28E−13 | −1.24E−16 | 3.00E−20 | 0.0 |
| Fourth lens | S7 | −1.395E+10 | −1.07E−06 | 4.79E−10 | −9.34E−13 | 5.90E−16 | −1.90E−19 | 0.0 |
| | S8 | 4.5591 | −3.45E−07 | 1.29E−09 | −1.95E−12 | 1.54E−15 | −4.53E−19 | 0.0 |
| Fifth lens | S9 | −0.1864 | −5.37E−07 | −6.54E−10 | 2.97E−12 | −2.62E−15 | −4.53E−19 | 0.0 |

TABLE 6

| Data No. 6 | | | | | f = 82.50, Fno = 1.00 | |
|---|---|---|---|---|---|---|
| Lens construction | Lens surface | Curvature radius RD | Face-to-face length TH | Abbe number ν d | Refractive index | |
| Screen | — | INFINITY | 1013.300 | — | 1 | |
| First lens | S1 | 78.842 | 7.210 | 57.9 | 1.4924 | |
| | S2 | 138.843 | 13.290 | | 1 | |
| Second lens | S3 | −284.661 | 10.000 | 57.9 | 1.4924 | |
| | S4 | −236.537 | 3.300 | | 1 | |
| Third lens | S5 | 66.880 | 22.000 | 61.25 | 1.59137 | |
| | S6 | −1243.060 | 16.030 | | 1 | |
| Fourth lens | S7 | 2142.180 | 10.000 | 57.9 | 1.4924 | |
| | S8 | −124.511 | 24.870 | | 1 | |
| Fifth lens | S9 | −46.797 | 4.500 | 57.9 | 1.4924 | |
| | S10 | −50.132 | 12.600 | | 1.44703 | |
| Transparent medium | Refrigerant | INFINITY | | — | | |
| CRT | Face surface | INFINITY | 14.100 | — | 1.56232 | |
| | Phosphor surface | −350.000 | 0.000 | | | |

TABLE 6-continued

| Lens construction | Lens surface | Aspherical coefficient | | | | | | Data No. 6 |
|---|---|---|---|---|---|---|---|---|
| | | K | A | B | C | D | E | F |
| First lens | S1 | 0.0604 | 1.66E−06 | 1.64E−09 | −1.07E−12 | 2.61E−16 | −2.68E−20 | 5.22E−25 |
| | S2 | 0.0163 | 6.26E−07 | 1.50E−09 | −2.37E−12 | 1.13E−15 | −2.13E−19 | 6.29E−24 |
| Second lens | S3 | 0 | −2.11E−06 | −3.04E−10 | −5.59E−13 | 5.14E−16 | −1.08E−19 | 0 |
| | S4 | 17.7867 | −1.41E−06 | 2.77E−10 | −2.34E−13 | 1.69E−16 | −3.96E−20 | 0 |
| Fourth lens | S7 | −6.475E+13 | 1.66E−06 | −1.30E−09 | 2.22E−12 | −2.07E−15 | 6.02E−19 | 3.94E−24 |
| | S8 | 6.0732 | −4.47E−07 | −2.18E−10 | −1.15E−12 | 1.27E−15 | −1.18E−18 | 3.28E−22 |
| Fifth lens | S9 | 0 | 9.95E−07 | 5.67E−10 | −2.07E−12 | 1.59E−15 | −4.45E−19 | 0 |

TABLE 7

Data No. 7  $f = 82.79$, $Fno = 1.03$

| Lens construction | Lens surface | Curvature radius RD | Face-to-face length TH | Abbe number ν d | Refractive index |
|---|---|---|---|---|---|
| Screen | — | INFINITY | 900.000 | — | 1 |
| First lens | S1 | 94.882 | 6.521 | 57.9 | 1.4924 |
| | S2 | 146.459 | 12.193 | | 1 |
| Second lens | S3 | −665.255 | 8.204 | 57.9 | 1.4924 |
| | S4 | −250.492 | 0.100 | | 1 |
| Third lens | S5 | 68.340 | 18.776 | 61.25 | 1.59137 |
| | S6 | −735.708 | 14.483 | | 1 |
| Fourth lens | S7 | −21133.183 | 8.252 | 57.9 | 1.4924 |
| | S8 | −109.403 | 23.334 | | 1 |
| Fifth lens | S9 | −45.653 | 4.113 | 57.9 | 1.4924 |
| | S10 | −54.068 | 12.600 | | 1.44703 |
| Transparent medium | Refrigerant | INFINITY | | — | |
| CRT | Face surface | INFINITY | 14.100 | — | 1.56232 |
| | Phosphor surface | −350.000 | 0.000 | | |

| Lens construction | Lens surface | Aspherical coefficient | | | | | | Data No. 7 |
|---|---|---|---|---|---|---|---|---|
| | | K | A | B | C | D | E | F |
| First lens | S1 | 0.1738 | 1.60E−06 | 1.67E−09 | −1.06E−12 | 2.61E−16 | −2.89E−20 | −1.28E−24 |
| | S2 | −1.7378 | 7.39E−07 | 1.46E−09 | −2.39E−12 | 1.12E−15 | −2.16E−19 | 6.41E−24 |
| Second lens | S3 | −54.6740 | −2.14E−06 | −2.91E−10 | −5.51E−13 | 5.16E−16 | −1.09E−19 | −2.53E−24 |
| | S4 | 18.8374 | −1.37E−06 | 2.76E−10 | −2.37E−13 | 1.69E−16 | −3.69E−20 | 3.42E−24 |
| Fourth lens | S7 | −6.475E+13 | 1.76E−06 | −1.20E−09 | 2.27E−12 | −2.05E−15 | 6.24E−19 | 2.98E−23 |
| | S8 | 6.4261 | −4.21E−07 | −3.30E−10 | −1.19E−12 | 1.28E−15 | −1.15E−18 | 3.47E−22 |
| Fifth lens | S9 | −0.0190 | −5.70E−07 | 6.34E−10 | −1.83E−12 | 1.75E−15 | −3.68E−19 | 3.60E−23 |

TABLE 8

Data No. 8  $f = 87.31$, $Fno = 1.07$

| Lens construction | Lens surface | Curvature radius RD | Face-to-face length TH | Abbe number ν d | Refractive index |
|---|---|---|---|---|---|
| Screen | — | INFINITY | 1050.896 | — | 1 |
| First lens | S1 | 100.000 | 10.000 | 57.9 | 1.4924 |
| | S2 | 183.411 | 10.690 | | 1 |
| Second lens | S3 | −247.993 | 10.000 | 57.9 | 1.4924 |
| | S4 | −224.144 | 2.785 | | 1 |
| Third lens | S5 | 68.092 | 22.000 | 61.25 | 1.59137 |
| | S6 | −606.684 | 16.948 | | 1 |
| Fourth lens | S7 | 12802.927 | 10.000 | 57.9 | 1.4924 |
| | S8 | −140.134 | 26.792 | | 1 |
| Fifth lens | S9 | −48.154 | 5.513 | 57.9 | 1.4924 |
| | S10 | −173.882 | 12.600 | | 1.44703 |
| Transparent medium | Refrigerant | INFINITY | | — | |
| CRT | Face surface | INFINITY | 14.100 | — | 1.56232 |
| | Phosphor surface | −350.000 | 0.000 | | |

TABLE 8-continued

| Lens construction | Lens surface | Aspherical coefficient | | | | | | Data No. 8 |
|---|---|---|---|---|---|---|---|---|
| | | K | A | B | C | D | E | F |
| First lens | S1 | 0.5035 | 1.56E-06 | 1.61E-09 | -1.07E-12 | 2.62E-16 | -2.61E-20 | 5.01E-25 |
| | S2 | 2.3056 | 5.50E-07 | 1.51E-09 | -2.35E-12 | 1.13E-15 | -2.12E-19 | 6.42E-24 |
| Second lens | S3 | 2.5268 | -2.09E-06 | -2.93E-10 | -5.53E-13 | 5.18E-16 | -1.06E-19 | 6.58E-25 |
| | S4 | 18.0775 | -1.42E-06 | 2.66E-10 | -2.38E-13 | 1.68E-16 | -3.92E-20 | 7.18E-25 |
| Fourth lens | S7 | -6.475E+13 | 1.63E-06 | -1.27E-09 | 2.26E-12 | -2.07E-15 | 5.84E-19 | -6.91E-24 |
| | S8 | 7.2557 | -2.13E-07 | -1.27E-10 | -1.09E-12 | 1.31E-15 | -1.17E-18 | 2.87E-22 |
| Fifth lens | S9 | 0.1201 | 4.88E-07 | 9.34E-10 | -1.96E-12 | 1.57E-15 | -4.93E-19 | -1.64E-23 |

TABLE 9

Data No. 9 $\quad$ f = 87.31, Fno = 0.87

| Lens construction | Lens surface | Curvature radius RD | Face-to-face length TH | Abbe number ν d | Refractive index |
|---|---|---|---|---|---|
| Screen | — | INFINITY | 1069.926 | — | 1 |
| First lens | S1 | 60.000 | 8.571 | 57.9 | 1.4924 |
| | S2 | 124.719 | 13.933 | | 1 |
| Second lens | S3 | -343.483 | 9.990 | 57.9 | 1.4924 |
| | S4 | -239.353 | 2.725 | | 1 |
| Third lens | S5 | 69.191 | 20.563 | 61.25 | 1.59137 |
| | S6 | -818.631 | 15.547 | | 1 |
| Fourth lens | S7 | 1428.895 | 8.693 | 57.9 | 1.4924 |
| | S8 | -127.335 | 24.289 | | 1 |
| Fifth lens | S9 | -46.911 | 5.460 | 57.9 | 1.4924 |
| | S10 | -141.198 | 12.600 | | 1.44703 |
| Transparent medium | Refrigerant | INFINITY | | — | |
| CRT | Face surface | INFINITY | 14.100 | — | 1.56232 |
| | Phosphor surface | -350.000 | 0.000 | | |

| Lens construction | Lens surface | Aspherical coefficient | | | | | | Data No. 9 |
|---|---|---|---|---|---|---|---|---|
| | | K | A | B | C | D | E | F |
| First lens | S1 | 0.0408 | 1.69E-06 | 1.65E-09 | -1.06E-12 | 2.64E-16 | -2.56E-20 | 1.08E-24 |
| | S2 | 0.5098 | 5.97E-07 | 1.49E-09 | -2.37E-12 | 1.12E-15 | -2.14E-19 | 5.72E-24 |
| Second lens | S3 | 2.5377 | -2.10E-06 | -3.01E-10 | -5.58E-13 | 5.14E-16 | -1.08E-19 | 1.96E-27 |
| | S4 | 17.5655 | -1.43E-06 | 2.74E-10 | -2.35E-13 | 1.69E-16 | -3.97E-20 | 1.40E-27 |
| Fourth lens | S7 | -6.475E+13 | 1.73E-06 | -1.27E-09 | 2.25E-12 | -2.06E-15 | 6.12E-19 | 1.03E-23 |
| | S8 | 5.4867 | -5.39E-07 | -2.75E-10 | -1.19E-12 | 1.25E-15 | -1.18E-18 | 3.32E-22 |
| Fifth lens | S9 | 0.0831 | 1.57E-06 | 7.31E-10 | -2.08E-12 | 1.51E-15 | -5.53E-19 | -1.04E-22 |

TABLE 10

Data No. 10 $\quad$ f = 83.85, Fno = 1.01

| Lens construction | Lens surface | Curvature radius RD | Face-to-face length TH | Abbe number ν d | Refractive index |
|---|---|---|---|---|---|
| Screen | — | INFINITY | 1044.755 | — | 1 |
| First lens | S1 | 77.631 | 7.076 | 57.9 | 1.4924 |
| | S2 | 128.327 | 12.890 | | 1 |
| Second lens | S3 | -290.988 | 10.000 | 57.9 | 1.4924 |
| | S4 | -228.167 | 2.758 | | 1 |
| Third lens | S5 | 71.333 | 22.000 | 61.25 | 1.59137 |
| | S6 | -888.869 | 18.419 | | 1 |
| Fourth lens | S7 | 906.304 | 10.000 | 57.9 | 1.4924 |
| | S8 | -110.000 | 24.819 | | 1 |
| Fifth lens | S9 | -46.469 | 5.500 | 57.9 | 1.4924 |
| | S10 | -11169.748 | 12.600 | | 1.44703 |
| Transparent medium | Refrigerant | INFINITY | | — | |
| CRT | Face surface | INFINITY | 14.100 | — | 1.56232 |
| | Phosphor surface | -350.000 | 0.000 | | |

TABLE 10-continued

| Lens construction | Lens surface | Aspherical coefficient | | | | | | Data No. 10 |
|---|---|---|---|---|---|---|---|---|
| | | K | A | B | C | D | E | F |
| First lens | S1 | 0.0957 | 1.65E−06 | 1.62E−09 | −1.07E−12 | 2.62E−16 | −2.63E−20 | 5.16E−25 |
| | S2 | 0.4893 | 5.99E−07 | 1.49E−09 | −2.38E−12 | 1.12E−15 | −2.14E−19 | 6.75E−24 |
| Second lens | S3 | 6.2517 | −2.07E−06 | −3.10E−10 | −5.63E−13 | 5.14E−16 | −1.07E−19 | 7.16E−25 |
| | S4 | 17.8616 | −1.46E−06 | 2.97E−10 | −2.25E−13 | 1.70E−16 | −3.98E−20 | −3.48E−25 |
| Fourth lens | S7 | −6.475E+13 | 1.75E−06 | −1.10E−09 | 2.35E−12 | −2.06E−15 | 5.56E−19 | 8.28E−24 |
| | S8 | 5.9063 | −3.53E−07 | −1.19E−10 | −1.12E−12 | 1.32E−15 | −1.15E−18 | 2.86E−22 |
| Fifth lens | S9 | −0.1718 | 6.39E−08 | 1.25E−09 | −2.25E−12 | 1.42E−15 | −4.29E−19 | 6.11E−23 |

TABLE 11

Data No. 11        $f = 89.29$, $Fno = 1.07$

| Lens construction | Lens surface | Curvature radius RD | Face-to-face length TH | Abbe number ν d | Refractive index |
|---|---|---|---|---|---|
| Screen | — | INFINITY | 1105.749 | — | 1 |
| First lens | S1 | 77.799 | 7.640 | 57.9 | 1.4924 |
| | S2 | 145.501 | 12.128 | | 1 |
| Second lens | S3 | −238.802 | 10.000 | 57.9 | 1.4924 |
| | S4 | −284.661 | 8.474 | | 1 |
| Third lens | S5 | 67.445 | 22.000 | 61.25 | 1.59137 |
| | S6 | −1119.491 | 17.092 | | 1 |
| Fourth lens | S7 | 1620.262 | 9.939 | 57.9 | 1.4924 |
| | S8 | −151.434 | 27.451 | | 1 |
| Fifth lens | S9 | −47.722 | 5.500 | 57.9 | 1.4924 |
| | S10 | −252.273 | 12.600 | | 1.44703 |
| Transparent medium | Refrigerant | INFINITY | | — | |
| CRT | Face surface | INFINITY | 14.100 | — | 1.56232 |
| | Phosphor surface | −350.000 | 0.000 | | |

| Lens construction | Lens surface | Aspherical coefficient | | | | | | Data No. 11 |
|---|---|---|---|---|---|---|---|---|
| | | K | A | B | C | D | E | F |
| First lens | S1 | 0.1056 | 1.48E−06 | 1.66E−09 | −1.06E−12 | 2.59E−16 | −2.80E−20 | 1.04E−24 |
| | S2 | −1.4803 | 6.83E−07 | 1.53E−09 | −2.36E−12 | 1.11E−15 | −2.18E−19 | 9.87E−24 |
| Second lens | S3 | 5.7831 | −2.00E−06 | −3.58E−10 | −5.75E−13 | 5.15E−16 | −1.05E−19 | 1.74E−24 |
| | S4 | 15.6998 | −1.59E−06 | 3.23E−10 | −2.13E−13 | 1.76E−16 | −3.76E−20 | 3.76E−25 |
| Fourth lens | S7 | −6.475E+13 | 1.10E−06 | −1.60E−09 | 2.17E−12 | −1.91E−15 | 7.74E−19 | −8.65E−23 |
| | S8 | 1.9890 | −6.75E−07 | −4.32E−10 | −1.17E−12 | 1.44E−15 | −1.04E−18 | 2.83E−22 |
| Fifth lens | S9 | −0.0371 | −7.47E−07 | 1.28E−09 | −2.15E−12 | 1.39E−15 | −4.46E−19 | 4.35E−23 |

TABLE 12

| Data No. | H(mm) | d(mm) | H/d | Distortion (%) |
|---|---|---|---|---|
| 1 | 68.58 | 90 | 0.762 | 7.50 |
| 2 | 66.68 | 90 | 0.741 | 7.50 |
| 3 | 63.50 | 90 | 0.706 | 7.50 |
| 4 | 68.58 | 100 | 0.686 | 5.50 |
| 5 | 63.50 | 90 | 0.706 | 3.50 |
| 6 | 68.46 | 95 | 0.721 | 6.85 |
| 7 | 68.46 | 97 | 0.706 | 7.51 |
| 8 | 68.46 | 97 | 0.706 | 6.77 |
| 9 | 68.46 | 90 | 0.761 | 1.28 |
| 10 | 68.46 | 97 | 0.706 | 7.50 |
| 11 | 68.46 | 95 | 0.721 | 7.50 |

H: Maximum image height of original image displayed on video generating source
d: Distance on optical axis from video generating source to entrance pupil How to read the lens data shown in Tables 1 to 11 in the above will be described below by using FIG. 1 and FIG. 2 on the basis of Table 1. Table 1 is shown with data classified into a spherical system mainly related to a lens area in the vicinity of the optical axis and aspherical system related to its outer peripheral portion.

First, it is shown that a curvature radius of the screen 11 is infinity (in other words, a plane), that a distance from the screen 11 to a surface $S_1$ of the first group lens 1 is 862 mm on the optical axis (face-to-face interval), and that a refractive index of medium between them is 1.0. In addition, it is shown that a curvature radius of the lens surface $S_1$ is 78.526 mm (the center of curvature is in the side of the video generating source), that a distance between the lens surfaces $S_1$ and $S_2$ on the optical axis (face-to-face interval) is 7.35 mm, and that a refractive index of medium between them is 1.4924. The subsequent content is similar and finally it is shown that the curvature radius of the phosphor surface P, of the projection tube panel 7 is 350 mm, that a thickness of the projection tube panel is 14.1 mm on the optical axis, and that a refractive index is 1.56232. Regarding the surfaces $S_1$ and $S_2$ of the first group lens 1, the surfaces $S_3$ and $S_4$ of the second group lens 2, the surfaces $S_7$ and $S_8$ of the fourth group lens 4, and the surface $S_9$ of the fifth group lens 5, aspherical coefficients are shown.

It should be noted that the aspherical coefficient is used when a shape of a lens surface is represented by the following expression:

$$Z(r) = \frac{r^2/RD}{1+\sqrt{1-(1+K)r^2/RD^2}} + Ar^4 + Br^6 + Cr^8 + Dr^{10} + Er^{12} + Fr^{14} + \cdots + Zr^{2n}$$

where K, A, B, C, D, E, F, - - -, and Z are arbitrary constants, n is an arbitrary natural number, and RD is a paraxial curvature radius.

Figure 4:
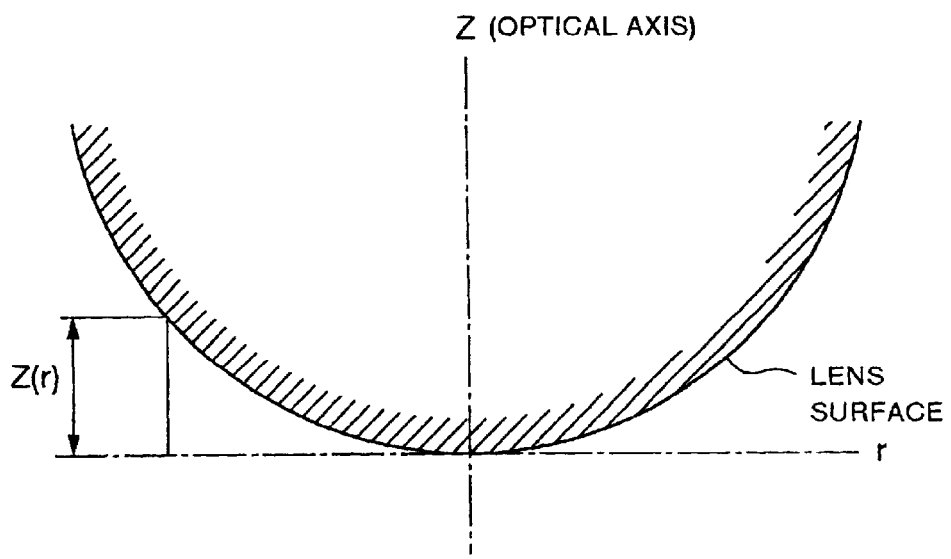
FIG. 4 is an explanatory diagram used for explaining a definition of a lens shape.
Figure 5:
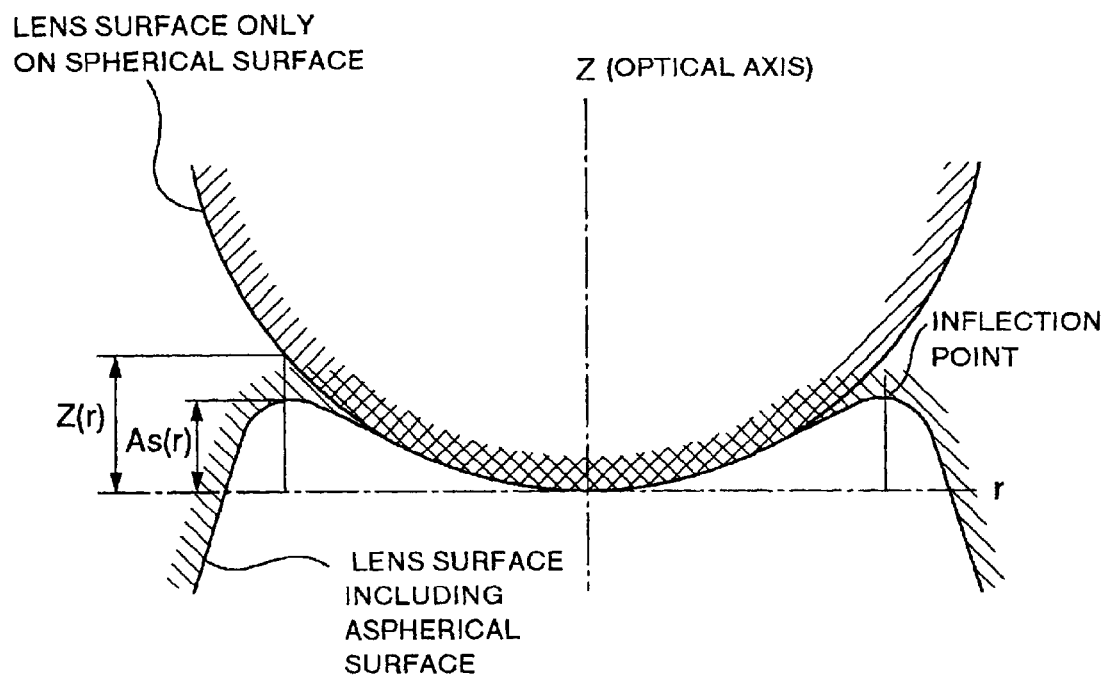
FIG. 5 is an explanatory diagram used for explaining a definition of a lens shape.

It should be noted that, however, Z(r) indicates a height of a lens surface measured with the Z axis in the optical axis direction from the screen toward the video generating source and r axis in the lens radius direction as shown in FIG. 4 and FIG. 5, which are definition explanatory diagrams of the lens shape. Character r indicates a distance in the radius direction and RD indicates a curvature radius. Therefore, if K, A, B, C, D, E, F and other coefficients are given, the height of the lens surface (hereinafter, referred to as a sag amount), namely, the shape is determined.

Referring to FIG. 5, there is shown an explanatory diagram of an aspherical surface $A_S$ (r); if respective values are substituted into terms of the above aspherical surface, a lens surface is obtained with a shift from the lens surface $S_s(r)$ of only the spherical system by ($A_S(r)-S_S(r)$). In addition, the smaller an absolute value of this ratio ($A_S$ (r)/$S_S$ (r)) is, the higher a degree of the aspherical surface is. Furthermore, in an arbitrary r position where a quadratic differential value is 0 in the above aspherical surface expression, there are inflection points where a direction of inclination of the surface changes and it is shown that the more the inflection points are, the more complicated the aspherical shape is. The above is how to read data shown in Tables 1 to 11.

Figure 11:
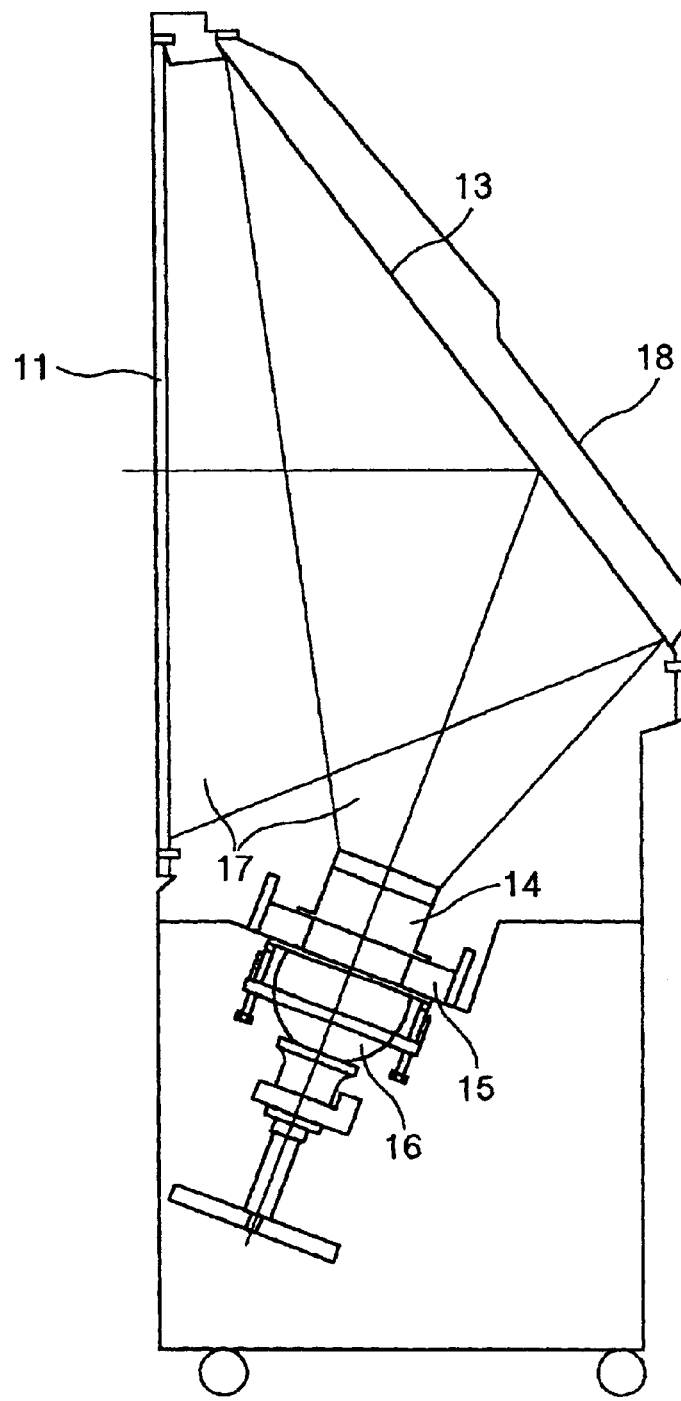
FIG. 11 is a screen vertical sectional view indicating a main portion of a rear projection type image display apparatus, which is an application of the projection lens apparatus according to the present invention.

In the embodiment of the projection lens apparatus according to the present invention, a raster of 5.39 inches is displayed on the projection tube phosphor surface $P_1$ so that the best performance is obtained when it is extendedly projected in one of the 54 and 64 inch sizes on the screen. The projection lens apparatus realizes short projections such as a projection length of 862 mm in the 54-inch size and a projection length of 1,013 mm in the 64-inch size. As shown in FIG. 11, a fully compact set can be achieved also in a rear projection type image display apparatus having only a single returning mirror 16. FIG. 11 will be described later.

In the embodiment of the present invention, the chromatic aberration and the spherical aberration in the third group lens 3 can be corrected with a good balance by setting curvature radiuses RS6 and RS5 of the incident surface S6 and the emitting surface S5 of the third group lens 3 to values within the following ranges:

−105796.523≦RS6≦844843.829

53.203≦RS5≦97.751

Figure 6:
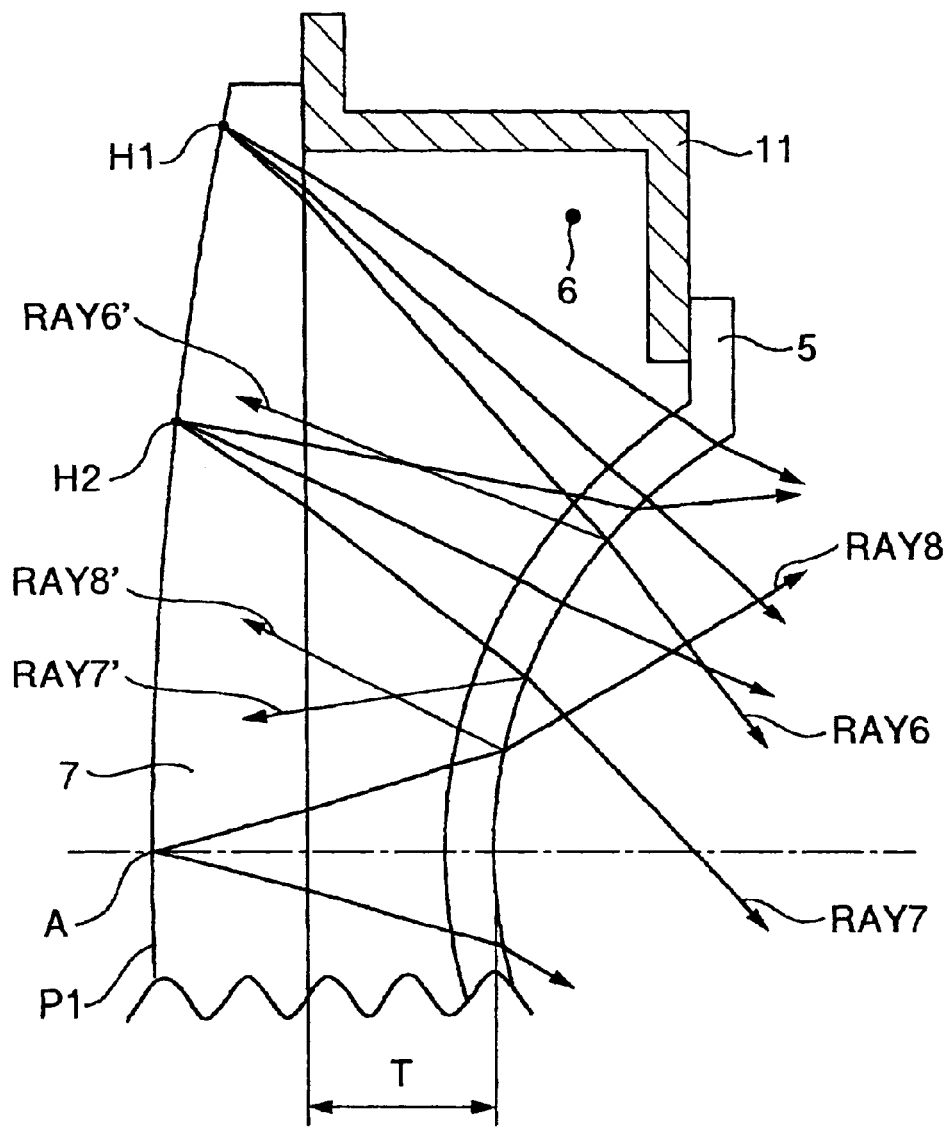
FIG. 6 is an explanatory diagram used for explaining a cause of contrast deterioration.

Next, a cause of deterioration of contrast will be described by using FIG. 6. Referring to FIG. 6, there is shown a detailed diagram of a portion from the projection tube to the fifth group lens 5 having a configuration shown in FIG. 1. In FIG. 6, the fifth group lens 5 has a configuration in which it is fixed to the bracket 10 with a distance therefrom. The same portions as in FIG. 1 are given like reference characters to omit the description.

In this configuration, a luminous flux of ray 6, ray 7 and ray 8 from high luminance points $H_1$, $H_2$ and A of the original image displayed on the phosphor surface $P_1$ of the projection tube (CRT) are reflected on the emitting surface S9 of the fifth lens group 5. These reflected lights ray 6', ray 7' and ray 8' return to a low luminance portion of the original image on the phosphor surface $P_1$ of the projection tube (CRT) to decrease the contrast. Contrast is represented by the ratio of the high luminance portion to the low luminance portion of the original image on the phosphor surface $P_1$ of the projection tube (CRT); the stronger the reflected lights ray 6', ray 7' and ray 8', the higher the luminance of the low luminance portion, by which the contrast is decreased.

In the configuration of the present invention, the distance T is increased in comparison with the conventional art regarding the projection tube panel 7 and the fifth group lens 5 so as to decrease the intensity of the reflected lights ray 6', ray 7' and ray 8' to realize high contrast.

Figure 7:
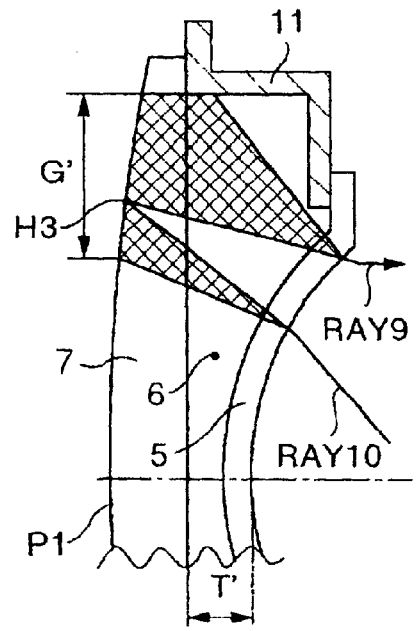
FIG. 7 is an explanatory diagram used for explaining a cause of contrast deterioration in a constitution according to a conventional art.
Figure 8:
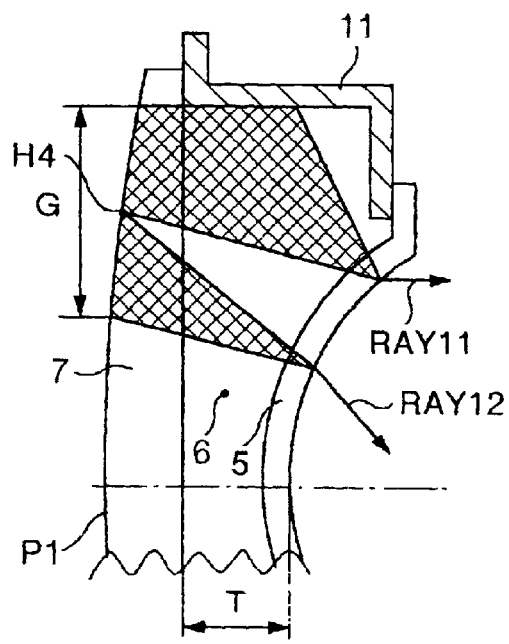
FIG. 8 is an explanatory diagram used for explaining a result of improving contrast according to an arrangement of the present invention.

Next, it will be visually described why the contrast is improved by increasing the distance T in comparison with the conventional art, by using FIGS. 7 and 8. Referring to FIG. 7, there is shown a diagram of the conventional art. Referring to FIG. 8, there is shown a configuration diagram of the present invention. A description of the configurations in FIGS. 7 and 8 will be omitted here since they are similar to that in FIG. 6.

In FIGS. 7 and 8, a luminous flux of ray 9, ray 10, ray 11 and ray 12 from high luminance points H3 and H4 of the original image displayed on the phosphor surface $P_1$ of the projection tube (CRT) are reflected on an emitting surface S9 of the fifth lens group 5 in the above configuration. These reflected lights ray 9', ray 10', ray 11' and ray 12' return to a low luminance portion of the original image on the phosphor surface $P_1$ of the projection tube (CRT) to decrease the contrast.

At this point, taking into consideration luminous fluxes between ray 9 and ray 10 and between ray 11 and ray 12, the reflected light returning to the low luminance portion has a return width G and G' and therefore the return width G is increased by using a configuration in which the distance T is increased. This wide return width G weakens the energy per area of the reflected light returning to the low luminance portion, thereby preventing the decrease of the contrast.

Comparing the second conventional art with the embodiment of the present invention, the distance T' of the second conventional art is 14.5 mm, while the distance T in the embodiment of the present invention is 17.1 mm, which is 2.6 mm longer than the conventional one. As a result, the return width G becomes 1.2 times longer than the conventional one.

Figure 9:
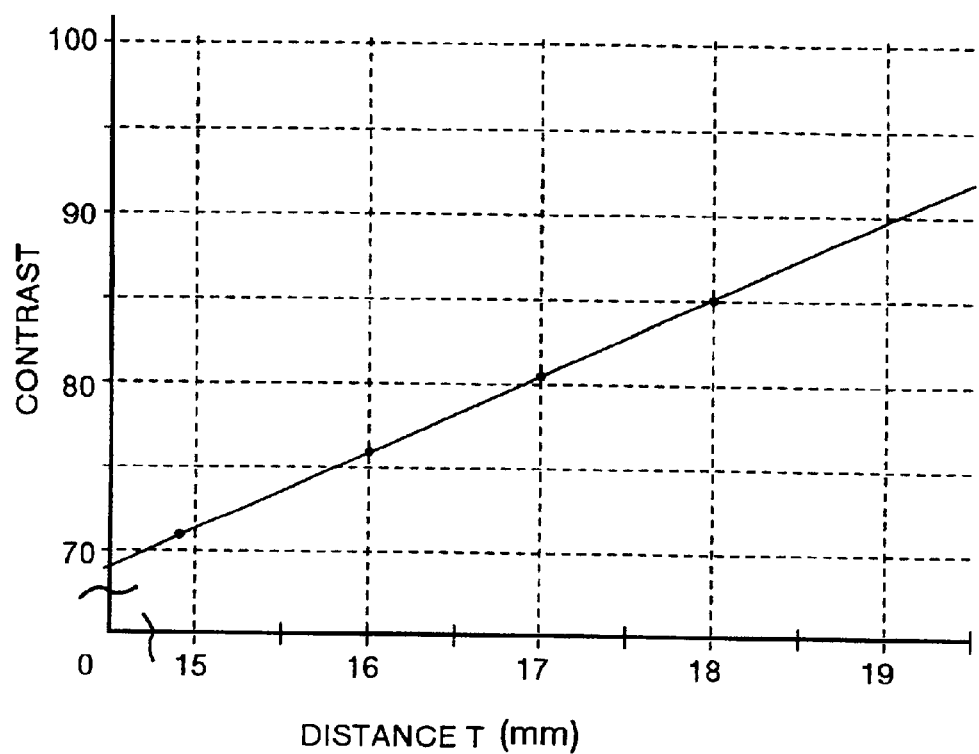
FIG. 9 is a correlation diagram based on an experiment of a distance and contrast between an image display portion and a lens element arranged nearest to it.

Referring to FIG. 9, there is shown a result of obtaining a relation between the distance T and the contrast by an experiment. This result shows that the distance T set to 15 mm or longer generates higher contrast than in the conventional art. The distance is set to 17.1 mm in this embodiment of the present invention and therefore contrast 80 is obtained in comparison with contrast 70 in the conventional art, which means it is 15% higher than the conventional one.

In addition, the increase of the distance T makes it extremely hard to correct aberrations favorably, but the aspherical plastic lens having a role of correcting aberrations is formed in a shape described later to increase the correcting capability, by which aberrations are favorably corrected.

Furthermore, in this embodiment, the fifth group lens 5 is provided with a wavelength selective filter, which absorbs wavelengths other than the dominant wavelength of the luminous flux of ray 6, ray 7 and ray 8 from the original image, in order to absorb spectrums unnecessary for an image quality, by which intensities of the reflected lights ray 6', ray 7' and ray 8' are effectively decreased and an occurrence of the chromatic aberration is suppressed. The 15% improvement of the contrast as compared with the conventional ratio includes an effect of the wavelength selective filter.

The following describes a shape of the aspherical plastic lens having a role of correcting aberrations. In the present invention, the aspherical shape of the aspherical plastic lens having a role of correcting aberrations is formed by an aspherical surface represented by 14 or higher degree of a coefficient.

As set forth in the above correspondingly to the lens group constructions, Tables 13 to 19 show degrees of the aspherical surface (absolute values of $A_{sn}/S_{sn}$, where n is a number of the lens surface having an aspherical surface; n=1, 2, 3, 4, 7, 8 or 9 in this embodiment) and the number of inflection points. Tables 13, 14, 15, 16, 17, 18 and 19 show an emitting surface S1 of the first group lens 1, an incident surface S2 of the first group lens 1, an emitting surface S3 of the second group lens 2, an incident surface S4 of the second group lens 2, an emitting surface S7 of the fourth group lens 4, an incident surface S8 of the fourth group lens 4, and an emitting surface S9 of the fifth group lens 5, respectively.

TABLE 13

S1

| Data No. | Number of inflection points (within effective radius) | As1 (mm) | Ss1 (mm) | As1/Ss1 | Effective radius (mm) |
|---|---|---|---|---|---|
| 1 | 2 | 4.670 | 17.672 | 0.264 | 49.63 |
| 2 | 2 | 4.825 | 17.707 | 0.272 | 49.62 |
| 3 | 1 | 4.230 | 17.198 | 0.246 | 49.62 |
| 4 | 1 | 2.561 | 16.359 | 0.157 | 49.62 |
| 5 | 1 | 0.675 | 16.369 | 0.041 | 49.62 |
| 6 | 2 | 4.477 | 17.573 | 0.255 | 49.62 |
| 7 | 2 | 2.051 | 14.009 | 0.146 | 49.62 |
| 8 | 1 | 1.346 | 13.179 | 0.102 | 49.62 |
| 9 | 2 | 12.125 | 26.268 | 0.462 | 49.62 |
| 10 | 2 | 5.070 | 17.928 | 0.283 | 49.62 |
| 11 | 2 | 5.650 | 17.878 | 0.316 | 49.62 |

TABLE 14

S2

| Data No. | Number of inflection points (within effective radius) | As2 (mm) | Ss2 (mm) | As2/Ss2 | Effective radius (mm) |
|---|---|---|---|---|---|
| 1 | 0 | 6.875 | 6.445 | 1.067 | 45.61 |
| 2 | 0 | 7.440 | 6.314 | 1.178 | 45.61 |
| 3 | 0 | 9.283 | 5.532 | 1.678 | 45.61 |
| 4 | 0 | 6.472 | 6.446 | 1.004 | 45.61 |
| 5 | 0 | 5.928 | 5.288 | 1.121 | 45.61 |
| 6 | 0 | 8.186 | 7.705 | 1.062 | 45.61 |
| 7 | 0 | 8.380 | 7.283 | 1.151 | 45.61 |
| 8 | 1 | 6.247 | 5.762 | 1.084 | 45.61 |

TABLE 14-continued

S2

| Data No. | Number of inflection points (within effective radius) | As2 (mm) | Ss2 (mm) | As2/Ss2 | Effective radius (mm) |
|---|---|---|---|---|---|
| 9 | 0 | 9.857 | 8.639 | 1.141 | 45.61 |
| 10 | 0 | 9.494 | 8.379 | 1.133 | 45.61 |
| 11 | 0 | 7.247 | 7.333 | 0.988 | 45.61 |

TABLE 15

S3

| Data No. | Number of inflection points (within effective radius) | As3 (mm) | Ss3 (mm) | As3/Ss3 | Effective radius (mm) |
|---|---|---|---|---|---|
| 1 | 1 | 4.868 | −3.083 | −1.579 | 41.78 |
| 2 | 1 | 4.922 | −2.998 | −1.642 | 41.77 |
| 3 | 1 | 4.878 | −2.794 | −1.746 | 41.77 |
| 4 | 1 | 4.459 | −3.187 | −1.399 | 41.77 |
| 5 | 1 | 6.908 | −0.660 | −10.467 | 41.77 |
| 6 | 1 | 4.865 | −3.081 | −1.579 | 41.77 |
| 7 | 1 | 6.786 | −1.313 | −5.169 | 41.77 |
| 8 | 1 | 4.027 | −3.543 | −1.137 | 41.77 |
| 9 | 1 | 5.309 | −2.549 | −2.082 | 41.77 |
| 10 | 1 | 4.733 | −3.014 | −1.571 | 41.77 |
| 11 | 1 | 4.012 | −3.681 | −1.090 | 41.77 |

TABLE 16

S4

| Data No. | Number of inflection points (within effective radius) | As4 (mm) | Ss4 (mm) | As4/Ss4 | Effective radius (mm) |
|---|---|---|---|---|---|
| 1 | 1 | −1.108 | −3.667 | 0.302 | 41.49 |
| 2 | 2 | −1.338 | −3.788 | 0.353 | 41.48 |
| 3 | 0 | −2.702 | −3.884 | 0.696 | 41.48 |
| 4 | 2 | −1.586 | −3.866 | 0.410 | 41.48 |
| 5 | 1 | −0.525 | −2.871 | 0.183 | 41.48 |
| 6 | 1 | −1.108 | −3.665 | 0.302 | 41.48 |
| 7 | 2 | −1.126 | −3.458 | 0.326 | 41.48 |
| 8 | 2 | −1.466 | −3.872 | 0.379 | 41.48 |
| 9 | 1 | −0.940 | −3.622 | 0.260 | 41.48 |
| 10 | 2 | −1.424 | −3.802 | 0.374 | 41.48 |
| 11 | 2 | −0.102 | −3.038 | 0.034 | 41.48 |

TABLE 17

S7

| Data No. | Number of inflection points (within effective radius) | As7 (mm) | Ss7 (mm) | As7/Ss7 | Effective radius (mm) |
|---|---|---|---|---|---|
| 1 | 2 | −0.851 | 0.062 | −13.726 | 35.30 |
| 2 | 0 | −1.040 | 0.062 | −16.774 | 35.30 |

TABLE 17-continued

S7

| Data No. | Number of inflection points (within effective radius) | As7 (mm) | Ss7 (mm) | As7/Ss7 | Effective radius (mm) |
|---|---|---|---|---|---|
| 3 | 0 | −2.064 | 0.063 | −32.762 | 35.30 |
| 4 | 0 | −1.736 | 2.997 | −0.579 | 35.30 |
| 5 | 0 | −1.928 | 4.737 | −0.407 | 35.30 |
| 6 | 2 | −1.454 | 0.291 | −5.000 | 35.30 |
| 7 | 0 | −2.189 | −0.029 | 74.256 | 35.30 |
| 8 | 1 | −1.480 | 0.049 | −30.417 | 35.30 |
| 9 | 0 | −1.804 | 0.436 | −4.136 | 35.30 |
| 10 | 0 | −2.171 | 0.688 | −3.157 | 35.30 |
| 11 | 0 | −0.605 | 0.385 | −1.573 | 35.30 |

TABLE 18

S8

| Data No. | Number of inflection points (within effective radius) | As8 (mm) | Ss8 (mm) | As8/Ss8 | Effective radius (mm) |
|---|---|---|---|---|---|
| 1 | 1 | −2.345 | −5.028 | 0.466 | 36.61 |
| 2 | 1 | −3.516 | −5.740 | 0.613 | 36.62 |
| 3 | 2 | −6.494 | −6.641 | 0.978 | 36.62 |
| 4 | 1 | −4.858 | −5.536 | 0.878 | 36.62 |
| 5 | 0 | −5.757 | −5.308 | 1.085 | 36.62 |
| 6 | 1 | −2.784 | −5.507 | 0.506 | 36.62 |
| 7 | 2 | −4.838 | −6.311 | 0.767 | 36.62 |
| 8 | 1 | −2.666 | −4.869 | 0.548 | 36.62 |
| 9 | 1 | −1.930 | −5.379 | 0.359 | 36.62 |
| 10 | 1 | −4.970 | −6.275 | 0.792 | 36.62 |
| 11 | 1 | −1.021 | −4.494 | 0.227 | 36.62 |

TABLE 19

S9

| Data No. | Number of inflection points (within effective radius) | As9 (mm) | Ss9 (mm) | As9/Ss9 | Effective radius (mm) |
|---|---|---|---|---|---|
| 1 | 0 | −20.598 | −19.893 | 1.035 | 38.29 |
| 2 | 0 | −22.534 | −21.107 | 1.068 | 38.28 |
| 3 | 0 | −27.198 | −23.347 | 1.165 | 38.28 |
| 4 | 0 | −22.017 | −20.220 | 1.089 | 38.28 |
| 5 | 0 | −27.142 | −19.273 | 1.408 | 38.28 |
| 6 | 0 | −20.586 | −19.879 | 1.036 | 38.28 |
| 7 | 0 | −21.666 | −20.776 | 1.043 | 38.28 |
| 8 | 0 | −20.188 | −18.940 | 1.066 | 38.28 |
| 9 | 1 | −19.703 | −19.795 | 0.995 | 38.28 |
| 10 | 0 | −18.907 | −20.125 | 0.940 | 38.28 |
| 11 | 0 | −17.101 | −19.226 | 0.890 | 38.28 |

As shown in Tables 13 to 19, in the lens groups forming the projection lens apparatus, the following relations are satisfied in absolute values of $A_{sn}/S_{sn}$ indicating the aspherical surface degree on the aspherical surface having two or more inflection points within an effective radius of each lens surface on at least one surface:

S1: $0.025 \leq A_{S1}/S_{S1} \leq 0.462$

S2: $0.806 \leq A_{S2}/S_{S2} \leq 2.194$

S3: $-78.036 \leq A_{S3}/S_{S3} \leq 84.667$

S4: $-0.549 \leq A_{S4}/S_{S4} \leq 0.911$

S7: $-32.756 \leq A_{S7}/S_{S7} \leq 74.256$

S8: $-1.729 \leq A_{S8}/S_{S8} \leq 1.216$

S9: $0.842 \leq A_{S9}/S_{S9} \leq 1.466$

According to the above construction, a sufficient aberration correcting capability is achieved in the aspherical plastic lens having a role of correcting aberrations of the projection lens apparatus. While Tables 13 to 19 only show typical data of this embodiment and they do not always show the upper or lower limit of the above conditional expression indicating the range of the aspherical surface amount, naturally any value can be applied only if it is within the range of this conditional expression.

In addition, in the embodiment of the present invention shown in Tables 1 to 11, assuming that $f_0$ is a focal length of the entire system of the projection lens apparatus, and that $f_1$, $f_2$, $f_3$, $f_4$ and $f_5$ are focal lengths of the first group lens 1, the second group lens 2, the third group lens 3, the fourth group lens 4 and the fifth group lens 5, respectively, the relations shown in Table 20 are satisfied.

TABLE 20

| Data No. | Lens power distribution | | | | | Focal length f0 |
|---|---|---|---|---|---|---|
| | f0/f5 | f0/f4 | f0/f3 | f0/f2 | f0/f1 | |
| 1 | −0.793 | 0.312 | 0.740 | 0.031 | 0.279 | 82.75 |
| 2 | −0.809 | 0.339 | 0.721 | 0.040 | 0.280 | 81.34 |
| 3 | −0.831 | 0.378 | 0.689 | 0.052 | 0.288 | 79.18 |
| 4 | −0.704 | 0.455 | 0.650 | 0.032 | 0.218 | 72.64 |
| 5 | −0.818 | 0.498 | 0.635 | 0.085 | 0.236 | 67.24 |
| 6 | −0.791 | 0.345 | 0.764 | 0.031 | 0.231 | 82.50 |
| 7 | −0.821 | 0.371 | 0.776 | 0.102 | 0.158 | 82.79 |
| 8 | −0.869 | 0.310 | 0.833 | 0.021 | 0.203 | 87.31 |
| 9 | −0.753 | 0.311 | 0.681 | 0.048 | 0.329 | 87.31 |
| 10 | −0.888 | 0.420 | 0.745 | 0.041 | 0.220 | 83.85 |
| 11 | −0.905 | 0.317 | 0.824 | −0.028 | 0.273 | 89.29 | f0: Focal length (mm) of entire lens system
f1: Focal length (mm) of first lens group
f2: Focal length (mm) of second lens group
f3: Focal length (mm) of third lens group
f4: Focal length (mm) of fourth lens group
f5: Focal length (mm) of fifth lens group In other words, the relation between the focal lengths of the lens groups and the focal length of the entire lens system of the projection lens apparatus according to the present invention (in other words, a power distribution of the lens groups) satisfies the following conditional expressions:

$0.112 \leq f_0/f_1 \leq 0.329$ $-0.028 \leq f_0/f_2 \leq 0.505$ $0.613 \leq f_0/f_3 \leq 0.833$ $0.004 \leq f_0/f_4 \leq 0.420$ $-0.905 \leq f_0/f_5 \leq -0.135$ As described above, in this embodiment, a part of positive refracting power of the entire system of the projection lens apparatus is allotted to the second group lens including the aspherical plastic lens for correcting the spherical aberration and the coma aberration arranged in the screen side other than a glass lens. This makes it possible to compensate for a shortage of the refracting power by using an inexpensive optical glass having a low refractive index to obtain a give refracting power.

Furthermore, in this embodiment, the power lens, which affects performance most significantly among the lens groups to be reference surfaces of the inner lens tube 8 holding the projection lens apparatus, is designed to have one of the surfaces having a long curvature radius of 166 mm or more. This reduces sensitivity to eccentricity or inclination caused by an assembly precision error, thereby preventing performance deterioration in response to a temperature change or moisture penetration.

Figure 10:
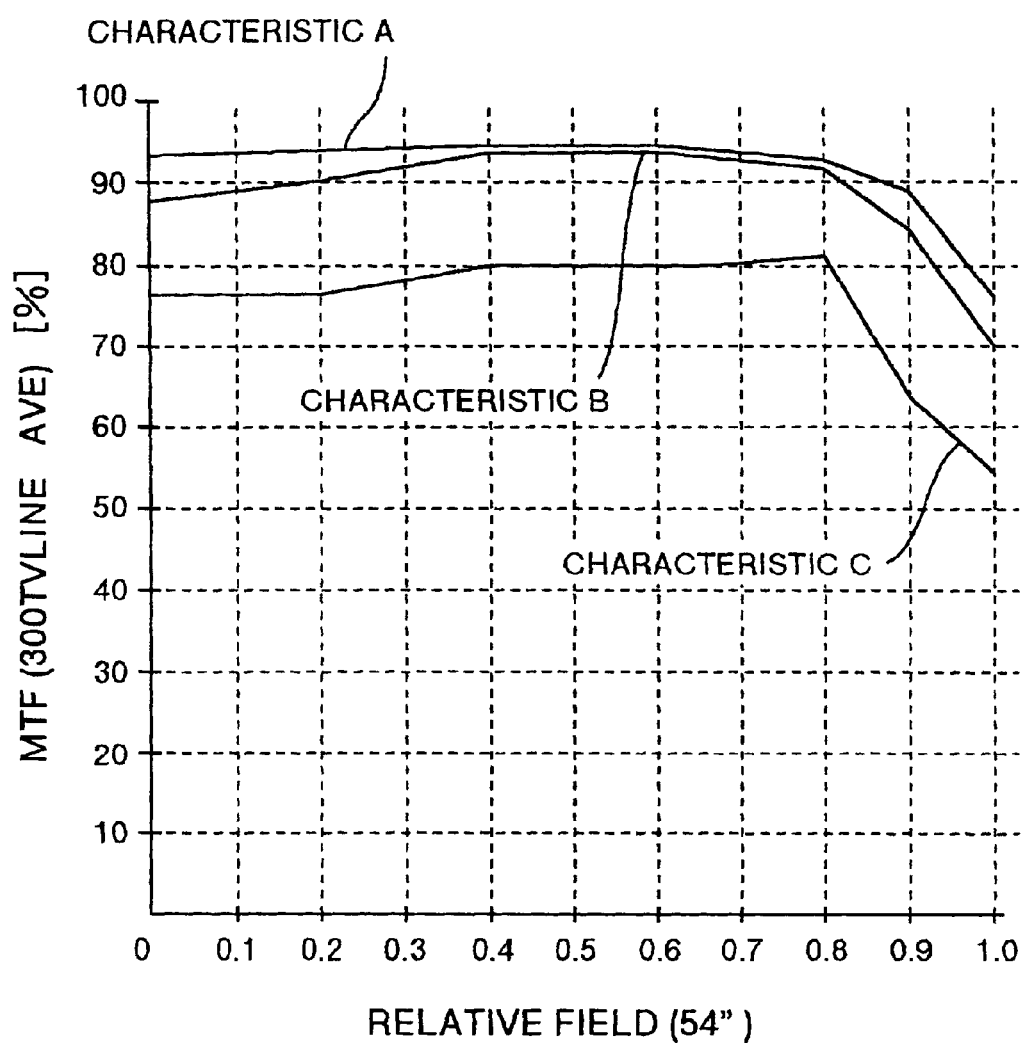
FIG. 10 is a MTF characteristic diagram of the projection lens apparatus according to the present invention.

The following shows a result of evaluation on focusing performance with an MTF (Modulation Transfer Function) in FIG. 10 in a condition that a 5.39-in. raster is displayed on the phosphor surface of the projection tube by using the projection lens apparatus according to the present invention described above and it is extendedly projected (54 in.) on the screen.

It should be noted that characteristic "A" corresponds to Table 1 and characteristic B2 corresponds to Table 2. Furthermore, characteristic C3 corresponds to data in Table 3. Frequencies are evaluated by taking 300 TV black-and-white stripe signals on the screen. Regarding the lens data shown in Tables 4 to 11, favorable MTF characteristics are obtained like those in FIG. 10 according to this configuration.

Referring to FIG. 11, there is shown a screen vertical sectional view indicating a main portion of the rear projection type image display apparatus, which is an application of the projection lens apparatus according to the present invention. In FIG. 11, there are shown a screen 11, a returning mirror 13, a projection lens apparatus 14, a projection tube (CRT) 16 which is a video generating source, a bracket 15 for fixing the projection lens apparatus 14 to the projection tube 16, a cabinet 18 of the rear projection type image display apparatus, and video luminous fluxes 17 from the projection lens apparatus 14.

In FIG. 11, a video light from the projection tube 16 is extended and projected by the projection lens apparatus 14 and the projected video luminous flux 17 is turned by the returning mirror 13 and projected from the rear side, by which a video with very little image distortion can be displayed on the screen 11.

As set forth hereinabove, according to the embodiment of the present invention, the following action and effect can be achieved.

(1) With an arrangement of a glass lens at a position where the entrance pupil is located between the incident surface and the emitting surface of the glass lens, the chief ray from each object point on the video generating source passes the vicinity of the optical axis on the incident and emitting surfaces of the glass lens, by which an occurrence of distortion and astigmatism can be suppressed to low.

(2) By partially distributing the refracting power of the glass lens to the aspherical plastic lens arranged in the screen side of the glass lens, an inexpensive optical glass having a low refractive index can be used.

(3) With a long curvature radius of one of the surfaces of the glass lens affecting the performance most significantly among the lens groups to be reference surfaces of the lens tube holding the projection lens apparatus, the performance can be prevented from deteriorating in response to a temperature change or moisture penetration.

(4) With a long distance between the video generating source and the lens elements arranged closest to the video generating source and providing the lens element with a wavelength selective filter, an intensity of the reflected light from the lens element can be reduced. This results in a 15% improvement of contrast as compared with the conventional one.

(5) In addition, in an aspherical plastic lens having a role of correcting aberrations, the aspherical surface is formed in an aspherical shape represented by a 14 or higher degree of coefficient, where many complicated aspherical shapes are applicable with a large aspherical surface amount, by which a sufficient capability of correcting aberrations can be achieved.

As set forth in the above, with the projection lens apparatus according to the present invention, a bright, high-contrast, and high-focusing image with a wide angle of field and low distortion is achieved all over the area of the screen and a compact rear projection type image display apparatus is realized. Furthermore, also in a construction of 5-groups 5-elements, an inexpensive glass lens can be used without deteriorating the focusing performance of the conventional construction of 6-groups 6-elements, by which a cost reduction is also achieved.

With an application of the projection lens apparatus according to the present invention, the following relation is satisfied between a distance (projection length) L (mm) from the tip of the lens surface in the screen side of the lens of the first group lens 1 closest to the screen to a transmission screen (49 to 71 inches) and the effective diagonal size M (inches) of the transmission screen, by which a compact set is achieved:

$$14.0 < (L/M) < 17.9$$

In the embodiment according to the present invention shown in Tables 1 to 11, a relation shown in Table 21 is satisfied, where a distance "A" (mm) is from the video generating source to a lens surface closest to the video generating source in the third lens group 3, a distance B (mm) from a lens surface closest to the screen of the lens in the third lens group 3 to the screen, Ma is a ratio B to A (B/A), M (inches) is an effective diagonal length of the screen, m (inches) is an effective diagonal length of the video generating source, and Mb is a ratio of M to m (M/m).

TABLE 21

| Data No. | A (mm) | B (mm) | M (inch) | m (inch) | Ma | Mb | Ma/Mb |
|---|---|---|---|---|---|---|---|
| 1 | 81.2 | 896.8 | 54.0 | 5.39 | 11.05 | 10.02 | 1.10 |
| 2 | 80.2 | 898.0 | 54.0 | 5.39 | 11.19 | 10.02 | 1.12 |
| 3 | 77.5 | 900.5 | 54.0 | 5.39 | 11.61 | 10.02 | 1.16 |
| 4 | 84.3 | 893.7 | 54.0 | 5.39 | 10.60 | 10.02 | 1.06 |
| 5 | 78.2 | 899.8 | 54.0 | 5.39 | 11.50 | 10.02 | 1.15 |
| 6 | 82.1 | 1047.1 | 64.0 | 5.39 | 12.75 | 11.87 | 1.07 |
| 7 | 76.882 | 927.02 | 64.0 | 5.39 | 12.06 | 11.87 | 1.02 |
| 8 | 85.952 | 1084.4 | 64.0 | 5.39 | 12.62 | 11.87 | 1.06 |
| 9 | 80.691 | 1105.1 | 64.0 | 5.39 | 13.70 | 11.87 | 1.15 |
| 10 | 85.438 | 1077.5 | 64.0 | 5.39 | 12.61 | 11.87 | 1.06 |
| 11 | 86.682 | 1144 | 64.0 | 5.39 | 13.20 | 11.87 | 1.11 |

A: Distance between video generating source and emitting surface of third lens group
B: Distance between emitting surface of third lens group and screen
M: Effective diagonal length of screen
m: Effective diagonal length of video generating source
Ma: Ratio (B/A)
Mb: Ratio (M/m)

Apparent from Table 21, the projection lens apparatus according to the present invention satisfies the following relational expression between a position where the glass lens is arranged and an angle of field (magnifying power):

10.6<Ma<13.7

1.01<(Ma/Mb)<1.16

With an arrangement of the third lens group 3 (power lens) having the above power distribution within the range of the above relation, it becomes possible to obtain a projection lens having a wide angle of field of 41 to 71 so as to achieve a favorable aberration correction and to suppress image distortion to 7.5% or lower.

In addition, a width of a luminous flux is not too much increased on the emitting surface of the third lens group 3 in spite of the wide angle of field and therefore there is no need for increasing an aperture of the plastic lens for correcting aberrations arranged in the screen side from the third lens group 3, by which this projection lens can be realized at low cost.

While the lens data according to this embodiment of the present invention shown in Tables 1 to 11 and Tables 12 to 21 show typical data preferable for working of the present invention and they do not necessarily show the upper limit and the lower limit of the ranges of the conditional expressions (the range of d/H, the aspherical surface range of each aspherical lens surface, the power distribution range of each lens group, and the arrangement range of the third lens group 3) described in this embodiment, naturally any value can be applied only if it is within the ranges of the conditional expressions and it is apparent that the above effects can be achieved at the upper limit, the lower limit, or in the vicinity thereof.

As set forth hereinabove, according to the present invention, image distortion is reduced and aberrations can be favorably corrected. In addition, contrast performance can be improved.

It should be further understood by those skilled in the art that the foregoing description has been made on embodiments of the invention and that various changes and modifications may be made in the invention without departing from the spirit of the invention and the scope of the appended claims.

What is claimed is:

1. A projection lens apparatus for making an extended projection of an original image displayed on a video generating source on a screen, comprising a plurality of lens elements, wherein:

the plurality of lens elements include a power lens having a strongest positive refracting power among the plurality of lens elements; and an entrance pupil of the projection lens apparatus is located between a light incident surface and a light emitting surface of the power lens, so that first and second principal rays pass an optical axis between the light incident surface and the light emitting surface; the first principal ray being from a first object point a surface of the source, the second principal ray being from a second object point between the first object point and a third object point on the optical axis.

2. A projection lens apparatus for making an extended projection of an original image displayed on a video generating source on a screen, comprising a plurality of lens elements, wherein:

the plurality of lens elements include in a direction from the screen to the video generating source in order, a first lens group including a meniscus lens having a convex lens surface in a central portion toward the screen, a second lens group including a lens having a convex lens surface in a central portion toward the video generating source, a third lens group including a power lens having a strongest positive refracting power among the plurality of lens elements, a fourth lens group including a lens having a convex lens surface in a central portion toward the video generating source with positive refracting power, and a fifth lens group including a lens having a concave lens surface toward the screen with negative refracting power; and an entrance pupil of the projection lens apparatus is located between a light incident surface and a light emitting surface of the power lens.

3. The apparatus according to claim 2, wherein following condition is satisfied, where H is a maximum image height of the original image displayed on the video generating source, and d is a distance on an optical axis from the video generating source to the entrance pupil located in the power lens $0.635 \leq H/d \leq 0.857$.

4. The apparatus according to claim 2, wherein following conditions are satisfied, where RS5 is a curvature radius of the light emitting surface of the power lens, and RS6 is a curvature radius of the light incident surface $-105796.523 \leq RS6 \leq 844843.829$ $53.203 \leq RS5 \leq 97.751$.

5. The apparatus according to claim 2, wherein an absolute value of a curvature radius is 166 mm or greater in one of the light incident surface and the light emitting surface of the power lens.

6. The apparatus according to claim 2, wherein an Abbe number of a glass material of the power lens is 60 or higher, and a refractive index of the glass material is 1,600 or lower.

7. The apparatus according to claim 2, wherein following conditions are satisfied, where $f_1$ is a focal length of the first lens group, $f_2$ is a focal length of the second lens group, $f_3$ is a focal length of the third lens group, $f_4$ is a focal length of the fourth lens group, $f_5$ is a focal length of the fifth lens group, and $f_0$ is a focal length of an entire system of the projection lens apparatus $0.112 \leq f_0/f_1 \leq 0.329$ $-0.028 \leq f_0/f_2 \leq 0.505$ $0.613 \leq f_0/f_3 \leq 0.833$ $0.004 \leq f_0/f_4 \leq 0.420$ $-0.905 \leq f_0/f_5 \leq -0.135$.

8. The apparatus according to claim 2, wherein:

a projection tube is used as the video generating source; and the fifth lens group comprises a meniscus lens baying a concave lens surface toward the screen with negative refracting power, a phosphor surface glass of the projection tube, and coolant for cooling the projection tube sealed between the meniscus lens and the phosphor surface glass; and a distance T between a light emitting surface of the meniscus lens and an emitting surface of the phosphor surface glass is set as follows $T \geq 15$ mm.

9. The apparatus according to claim 8, wherein at least one of the meniscus lens and the coolant is provided with a wavelength selective filter.

10. The apparatus according to claim 2, wherein at least one surfaces of lenses of the first lens group, the second lens group, the fourth lens group and the fifth lens group has an aspherical shape of 14 or higher degree of an aspherical surface coefficient, where the aspherical surface coefficients indicate coefficients K, A, B, C, D, E, F, . . . , Z when a surface shape is represented by a following equation and a 14-degree coefficient corresponds to F, and where n is an arbitrary natural number and RD is a paraxial curvature radius $$Z(r) = \frac{r^2/RD}{1 + \sqrt{1-(1+K)r^2/RD^2}} + Ar^4 + Br^6 + Cr^8 + Dr^{10} +$$
$$Er^{12} + Fr^{14} + \cdots + Zr^{2n}.$$

11. The apparatus according to claim 2, wherein at least one surfaces of lenses of the first lens group, the second lens group, the fourth lens group and the fifth lens group has an aspherical shape with two or more inflection points within an effective radius.

12. The apparatus according to claim 2, wherein following conditions are satisfied, where $A_{S1}$ is an aspherical surface amount to a spherical amount $S_{S1}$ of a light emitting surface of the first lens group, $A_{S2}$ is an aspherical surface amount to a spherical amount $S_{S2}$ of a light incident surface of the first lens group, $A_{S3}$ is an aspherical surface amount to a spherical amount $S_{S3}$ of a light emitting surface of the second lens group, $A_{S4}$ is an aspherical surface amount to a spherical amount $S_{S4}$ of a light incident surface of the second lens group, $A_{S7}$ is an aspherical surface amount to a spherical amount $S_{S7}$ of a light emitting surface of the fourth lens group, $A_{S8}$ is an aspherical surface amount to a spherical amount $S_{S8}$ of a light incident surface of the fourth lens group, and $A_{S9}$ is an aspherical surface amount to a spherical amount $S_{S9}$ of a light emitting surface of the fifth lens group $S1: 0.025 \leq A_{S1}/S_{S1} \leq 0.462$ $S2: 0.806 \leq A_{S2}/S_{S2} \leq 2.194$ $S3: -78.036 \leq A_{S3}/S_{S3} \leq 84.667$ $S4: -0.549 \leq A_{S4}/S_{S4} \leq 0.911$ $S7: -32.756 \leq A_{S7}/S_{S7} \leq 74.256$ $S8: -1.729 \leq A_{S8}/S_{S8} \leq 1.216$ $S9: 0.842 \leq A_{S9}/S_{S9} \leq 1.466$.

13. A rear projection type image display apparatus, comprising:
the projection lens apparatus according to claim 2 arranged ahead of the video generating source; and
the screen arranged on an imaging surface ahead of the projection lens apparatus.

14. The projection lens apparatus according to claim 13, wherein following relation is satisfied between a distance L, a unit of which is millimeter, from a light emitting surface of the first lens group having the projection lens apparatus to the transmission screen and an effective diagonal length M of the screen a unit of which is inch $14.0 < (L/M) < 17.9$.

15. The projection lens apparatus according to claim 13, wherein a diagonal length of the screen is within a range of 49 to 71 inches.

16. The projection lens apparatus according to claim 13, wherein following relation is satisfied between a distance "A", a unit of which is millimeter, from the video generating source to a lens surface closest to the video generating source among the lens surfaces of a third lens group forming the projection lens apparatus and a distance B, a unit of which is millimeter, from a lens surface closest to the screen among lens surfaces of the third lens group to the transmission screen a size of which is 49 to 71 inches $10.6 < (B/A) < 13.7$.

17. The projection lens apparatus according to claim 13, wherein following relation is satisfied between ratios Ma and Mb, where a distance "A" a unit of which is millimeter is a distance from the video generating source to a light incident surface of the third lens group, a distance B a unit of which is millimeter is a distance from a light emitting surface of the third lens group to the screen, the ratio Ma is a ratio B to "A", an effective diagonal length M a unit of which is inch is an effective diagonal length of the screen, an effective diagonal length m a unit of which is inch is an effective diagonal length of the video generating source, and the ratio Mb is a ratio of M to m $1.01 < (Ma/Mb) < 1.16$.

18. A projection lens apparatus for making an extended projection of an original image displayed on a projection tube on a screen, comprising a plurality of lens elements, wherein:
the plurality of lens elements are arranged closest to the projection tube video generating source, and include a meniscus lens having negative refracting power, a light incident surface of the meniscus lens being put in contact with coolant for cooling the projection tube; and
a distance T between a light emitting surface of the meniscus lens and an emitting surface of the phosphor surface glass is set as follows $T \geq 15$ mm.

19. A projection lens apparatus for making an extended projection of an original image displayed on a video generating source on a screen, comprising a plurality of lens elements, wherein:
the plurality of lens elements include a power lens having a strongest positive refracting power among the plurality of lens elements, and a plurality of aberration correcting lenses; and
at least one surface of at least one of the aberration correcting lenses has an aspherical shape of at least 14-degree of an aspherical coefficient.

20. The apparatus according to claim 19, wherein at least one surface of at least one of the aberration correcting lenses has two or more inflection points within an effective radius.

21. The apparatus according to claim 19, wherein an entrance pupil is located between a light incident surface and a light emitting surface of the power lens.

22. A rear projection type image display apparatus, comprising:

a video generating source;

a screen; and a projection lens apparatus having a plurality of lens elements for making an extended projection of an original image displayed on the image generating source on the screen, wherein the plurality of lens elements of the projection lens apparatus include a power lens having a strongest positive refracting power among the plurality of lens elements; and an entrance pupil is located between a light incident surface and a light emitting surface of the power lens, wherein first and second rays pass an optical axis between the light incident surface and the light emitting surface, the first ray being from a first object point a surface of the source, the second ray being from a second object point between the first object point and a third object point on the optical axis.

* * * * *